(12) United States Patent
Moselage, III

(10) Patent No.: US 9,168,998 B2
(45) Date of Patent: Oct. 27, 2015

(54) COMPOSITE PROPELLER SPAR

(75) Inventor: John Henry Moselage, III, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 1008 days.

(21) Appl. No.: 13/303,269

(22) Filed: Nov. 23, 2011

(65) Prior Publication Data

US 2013/0129507 A1    May 23, 2013

(51) Int. Cl.
*F03D 3/06*    (2006.01)
*B64C 11/26*   (2006.01)

(52) U.S. Cl.
CPC ........... *B64C 11/26* (2013.01); *Y10T 29/49337* (2015.01)

(58) Field of Classification Search
CPC ........ B64C 11/04; B64C 11/08; B64C 11/10; B64C 11/12; B64C 11/26; B64C 11/20; B64C 11/22; B64C 11/24; B64C 11/184; B64C 27/473; B64C 27/4736; B64C 27/48; F03D 3/061; F03D 3/062; Y10T 29/49337
USPC .......... 416/226, 233, 234, 229 R, 204 R, 239, 416/248; 29/889.6
See application file for complete search history.

(56) References Cited

U.S. PATENT DOCUMENTS

| | | | | |
|---|---|---|---|---|
| 2,259,247 A * | 10/1941 | Dornier | ......................... | 416/226 |
| 2,290,607 A * | 7/1942 | De Lavaud | ................ | 416/134 R |
| 2,344,876 A * | 3/1944 | Jamison | ......................... | 416/209 |
| 2,600,048 A * | 6/1952 | Conwell | ......................... | 416/226 |
| 4,096,012 A * | 6/1978 | Belko et al. | .................... | 156/214 |
| 5,129,787 A * | 7/1992 | Violette et al. | ................ | 416/226 |
| 5,462,618 A * | 10/1995 | Rogers et al. | ................. | 156/161 |
| 5,755,558 A * | 5/1998 | Reinfelder et al. | ........... | 416/230 |
| 5,885,059 A * | 3/1999 | Kovalsky et al. | ............. | 416/224 |
| 6,305,905 B1 | 10/2001 | Nagle et al. | | |
| 7,467,763 B2 * | 12/2008 | Kismarton | .............. | 244/104 LS |
| 7,972,114 B2 * | 7/2011 | Gupta et al. | ................... | 416/226 |
| 8,272,841 B2 | 9/2012 | Pentony | | |
| 2005/0186081 A1 * | 8/2005 | Mohamed | ...................... | 416/226 |
| 2006/0093802 A1 * | 5/2006 | Tsai et al. | ...................... | 428/216 |
| 2009/0220747 A1 * | 9/2009 | Karem | .......................... | 428/172 |
| 2010/0061858 A1 * | 3/2010 | Jones | ......................... | 416/204 R |
| 2010/0068065 A1 * | 3/2010 | Jensen | ...................... | 416/241 R |
| 2010/0104443 A1 * | 4/2010 | Pentony | .................... | 416/219 A |
| 2011/0176928 A1 * | 7/2011 | Jensen | .......................... | 416/233 |
| 2011/0223032 A1 * | 9/2011 | Tobin | ........................ | 416/229 R |

FOREIGN PATENT DOCUMENTS

EP          0610273 B1    12/1995

* cited by examiner

*Primary Examiner* — Dwayne J White
*Assistant Examiner* — Joshua R Beebe
(74) *Attorney, Agent, or Firm* — Yee & Associates, P.C.

(57) ABSTRACT

A method and apparatus comprising a composite spar. The composite spar has a root section and a main section. The root section is closed and has a shape configured to be connected to a blade retention system. The main section has an open channel. The composite spar is configured for placement inside of a blade.

21 Claims, 28 Drawing Sheets

FIG. 30
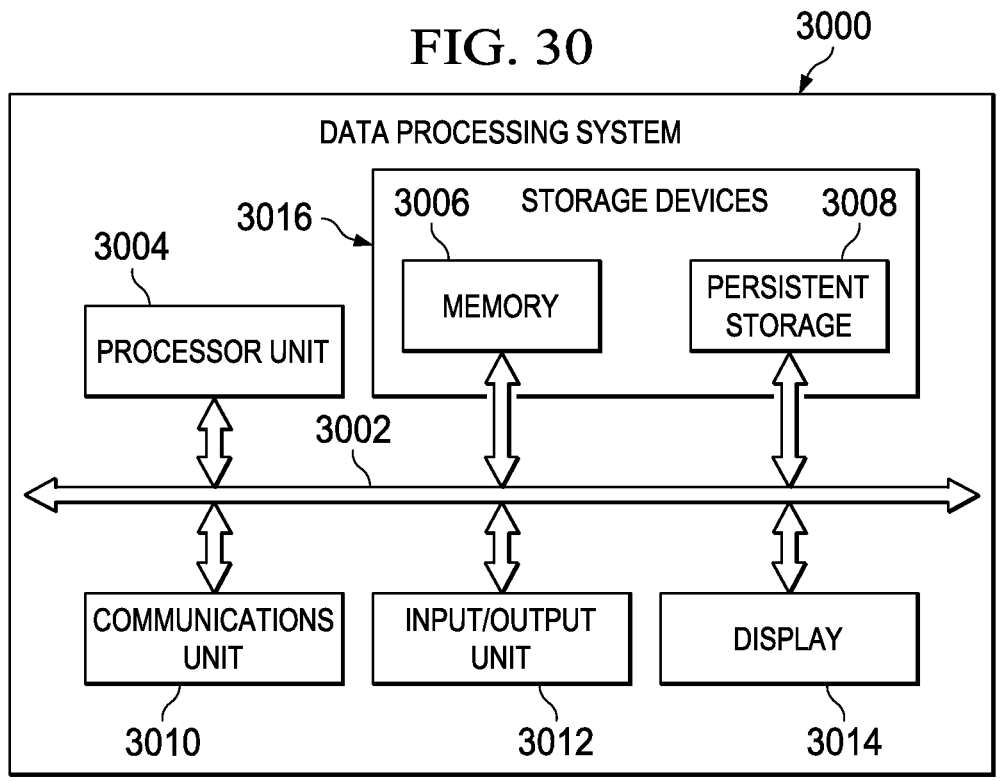
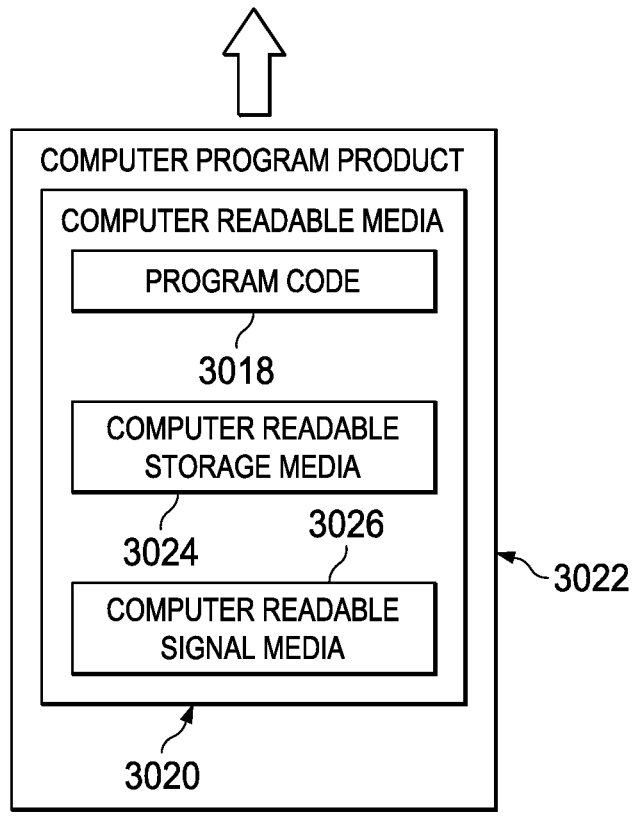

- 3102 SPECIFICATION AND DESIGN
- 3104 MATERIAL PROCUREMENT
- 3106 COMPONENT AND SUBASSEMBLY MANUFACTURING
- 3108 SYSTEM INTEGRATION
- 3110 CERTIFICATION AND DELIVERY
- 3112 IN SERVICE
- 3114 MAINTENANCE AND SERVICE

COMPOSITE PROPELLER SPAR

BACKGROUND INFORMATION

1. Field

The present disclosure relates generally to vehicles and, in particular, to blades used on vehicles. Still more particularly, the present disclosure relates to composite propeller blades.

2. Background

A propeller is a mechanical structure that converts rotational motion into thrust. With a propeller, a pressure difference may be produced between the forward and rear surfaces of an airfoil-shaped blade. As a result, a fluid in which the propeller is located may be accelerated behind the blade. This fluid may be air or water.

With aircraft, the propellers convert rotary motion generated by aircraft engines to provide the force to move the aircraft. Propellers may be made of many different types of materials. Propellers have been made from materials, such as wood and metal. Current propellers may employ composite materials. When blades for a propeller are made from composite materials, the propeller may be lighter, stronger, and stiffer than a similar propeller made from metal.

The characteristics of composite materials that provide lighter, stronger and stiffer structures, however, may include additional challenges.

For example, connecting a blade to a hub shaped assembly for a propeller with fasteners may provide challenges. In this regard, the load at locations in which fasteners are used may provide points at which vibrations may generate inconsistencies. As a result, the useful life of the propeller may be significantly shortened.

One solution involves forming the entire blade and retention mechanism in a single structure. This design, however, may be more complex and expensive than desired.

Therefore, it would be desirable to have a method and apparatus that takes into account at least some of the issues discussed above, as well as possibly other issues.

SUMMARY

In one embodiment, an apparatus comprises a root section and a main section. The root section is for a composite spar. The root section is closed and has a shape configured to be connected to a blade retention system. The main section is for the composite spar and has an open channel. The composite spar is configured for placement inside of a blade.

In another embodiment, a method is present for manufacturing a composite structure. A composite spar is formed in which the composite spar has a root section that is closed and a main section having an open channel. The root section has a shape configured to be connected to a blade retention system.

In yet another embodiment, a method for operating a vehicle is present. A propeller with blades is rotated. A blade in the blades is retained through a root section of a spar in the blade in the blades being retained to a blade retention system. The root section is shaped. The root section is configured to be retained within a corresponding shape for the blade retention system entirely by the shape of the root section and the corresponding shape of the blade retention system.

In yet another embodiment, a blade system comprises a blade. The blade has a root section shaped and configured to be retained within a correspondingly shaped blade retention system entirely by the shape of the root section and a corresponding shape of the blade retention system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the embodiments are set forth in the appended claims. The embodiments, however, as well as a preferred mode of use and further objectives thereof will best be understood by reference to the following detailed description of an illustrative embodiment of the present disclosure when read in conjunction with the accompanying drawings, wherein:

FIG. 30 is an illustration of a data processing system in accordance with an embodiment;

DETAILED DESCRIPTION

The different embodiments recognize and take into account that depending on the design, any time holes are drilled in a composite structure to add fasteners, stress at those points may be greater than desired. The different embodiments further recognize and take into account that the loads and vibrations that may occur on the blade at the location of the holes may increase a possibility that inconsistencies may occur over time.

The different embodiments recognize and take into account that one solution may be to bond the blade to a retention unit that holds the blade to a hub shaped assembly.

The different embodiments also recognize and take into account that the retention unit may include a structure that may fit inside of the blade in a manner that reduces the number of fasteners needed. The different embodiments, however, recognize and take into account that even with reducing the number of fasteners, any drilling of holes in a composite blade may be undesirable.

Therefore, the different embodiments provide a blade for a propeller that avoids using fasteners. In one embodiment, a spar in the blade is formed in a manner such that the spar has an end at the root of the blade that is configured for connection to a retention system or other structure for the propeller without the use of fasteners.

In one embodiment, a composite spar may comprise a root section, a transition section, and a main section. The root section is closed and has a shape configured to be connected to a blade retention system. The main section for the composite spar has a channel. In these illustrative examples, the transition section is located between the root section and the main section and includes a transition from the closed section to the open section. The composite spar is configured for placement inside of a blade such that the composite spar extends from a root of the blade to a tip of the blade. The root does not need holes for fasteners in the illustrative examples.

Figure 1:
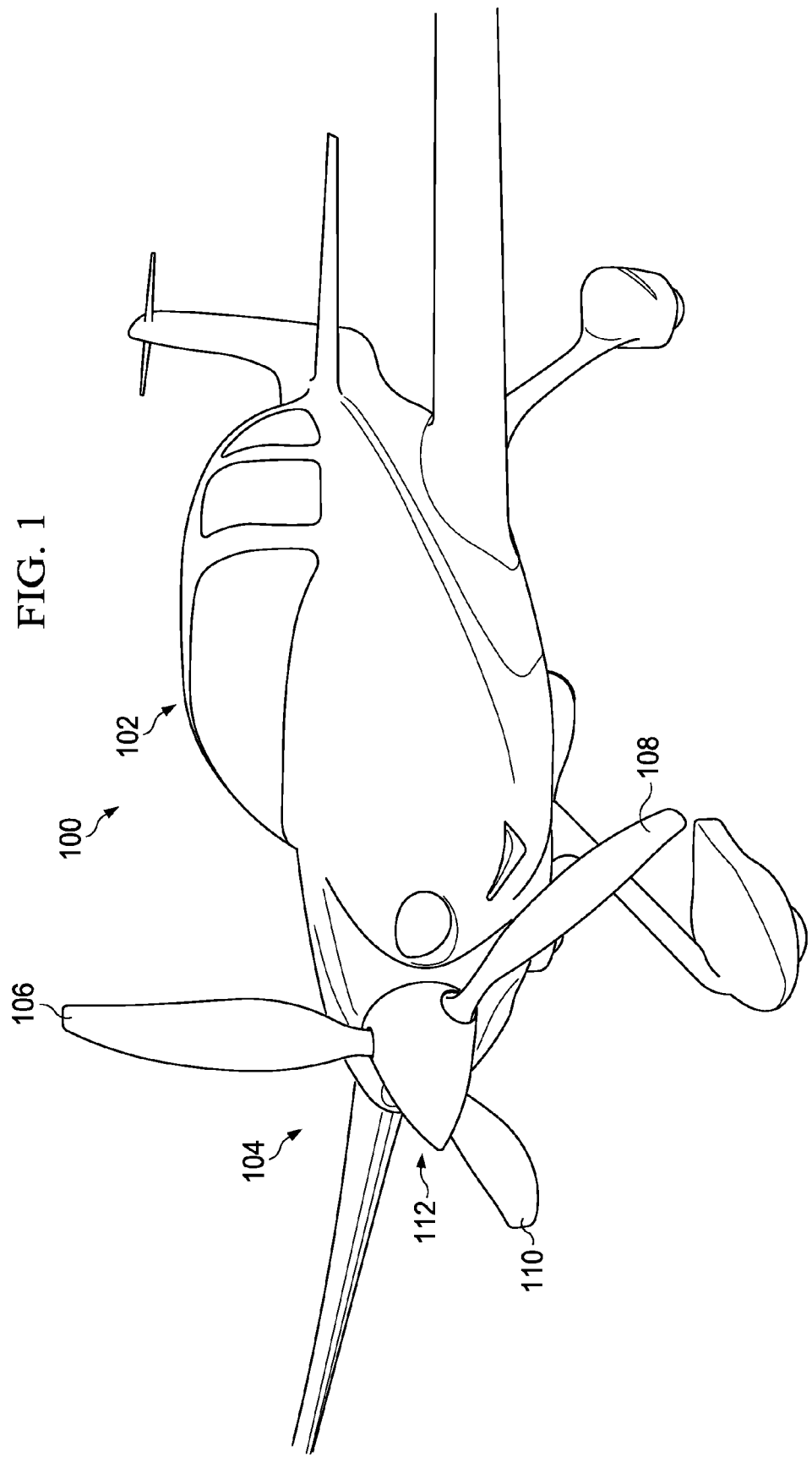
FIG. 1 is an illustration of an aircraft with a propeller in which a composite spar may be implemented in accordance with an embodiment.

With reference now to the figures and, in particular, with reference to FIG. 1, an illustration of an aircraft with a propeller in which a composite spar may be implemented is depicted in accordance with an embodiment. In this illustrative example, aircraft 100 takes the form of airplane 102. As illustrated, airplane 102 has propeller 104. Propeller 104 comprises composite blade 106, composite blade 108, composite blade 110, and hub shaped assembly 112. Composite blade 106, composite blade 108, and composite blade 110 are connected to hub shaped assembly 112. Hub shaped assembly 112 is an example of a blade retention system for composite blade 106, composite blade 108, and composite blade 110 in propeller 104.

In these illustrative examples, composite blade 106, composite blade 108, and composite blade 110 may be manufactured in accordance with an embodiment. In particular, these composite blades may include composite spars, which may be attached to hub shaped assembly 112 without the need for fasteners.

Figure 2:
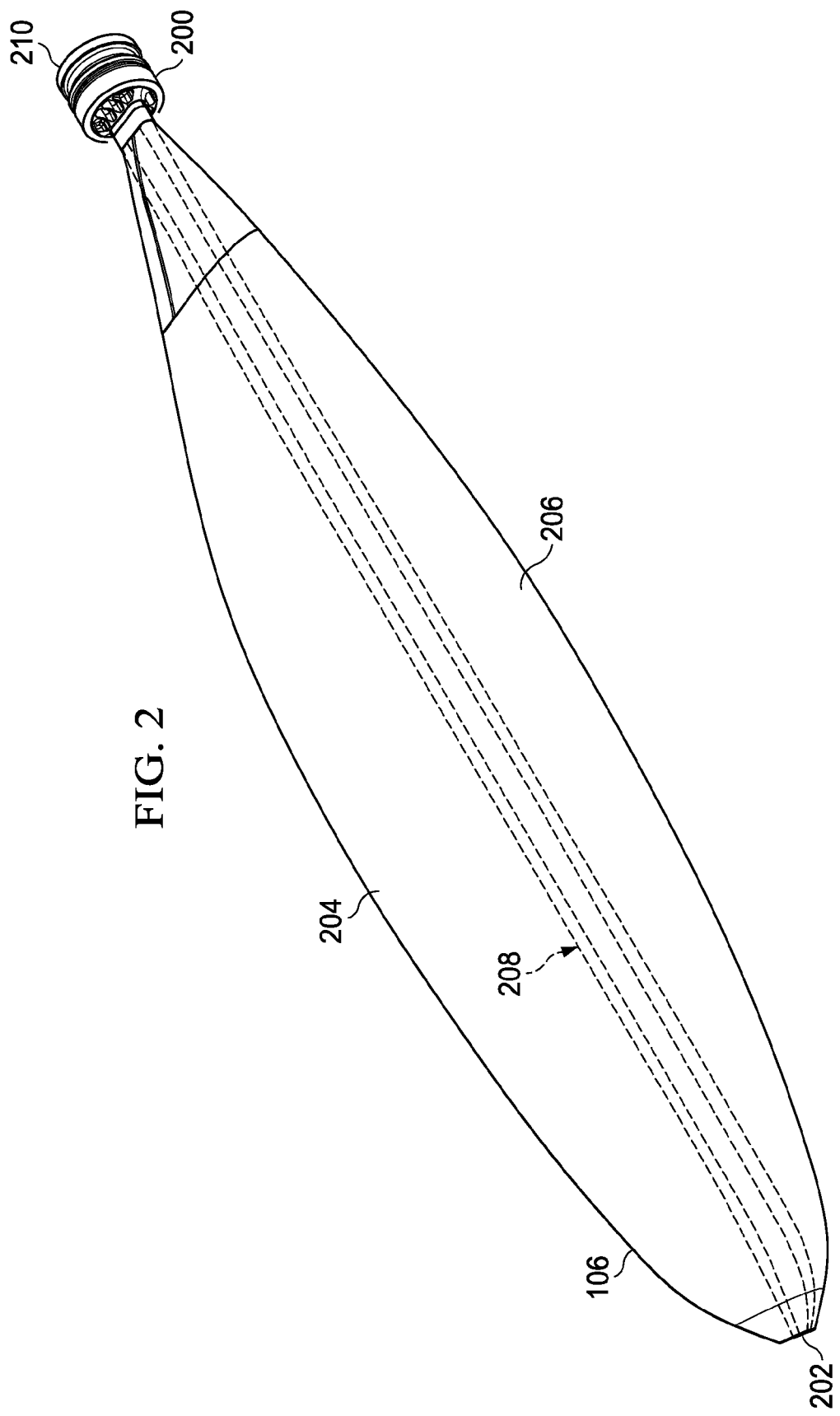
FIG. 2 is an illustration of a composite blade in accordance with an embodiment.

With reference now to FIG. 2, an illustration of a composite blade is depicted in accordance with an embodiment. In this illustrative example, a more-detailed view of composite blade 106 removed from propeller 104 in FIG. 1 is shown.

Composite blade 106 has root section 200 and tip 202. In this example, first skin 204 on first side 206 of composite blade 106 is depicted. Additionally, composite spar 208 is seen in phantom in this illustrative example.

Further, composite spar 208 is shown as being secured to collet 210. Collet 210 is part of a blade retention system for retaining composite blade 106.

In these illustrative examples, root section 200 has a shape and is configured for retention entirely by the shape of root section 200 and the corresponding shape of a hub shaped assembly, such as hub shaped assembly 112 in FIG. 1. More specifically, the shape of root section 200 is such that composite blade 106 is retained by collet 210. The retention of composite blade 106 is entirely by the shape of root section 200 and the corresponding shape of collet 210 in the blade retention system. In other words, holes do not need to be formed in composite blade 106 for fasteners to retain composite blade 106 in collet 210 during operation of aircraft 100 in FIG. 1.

Figure 3:
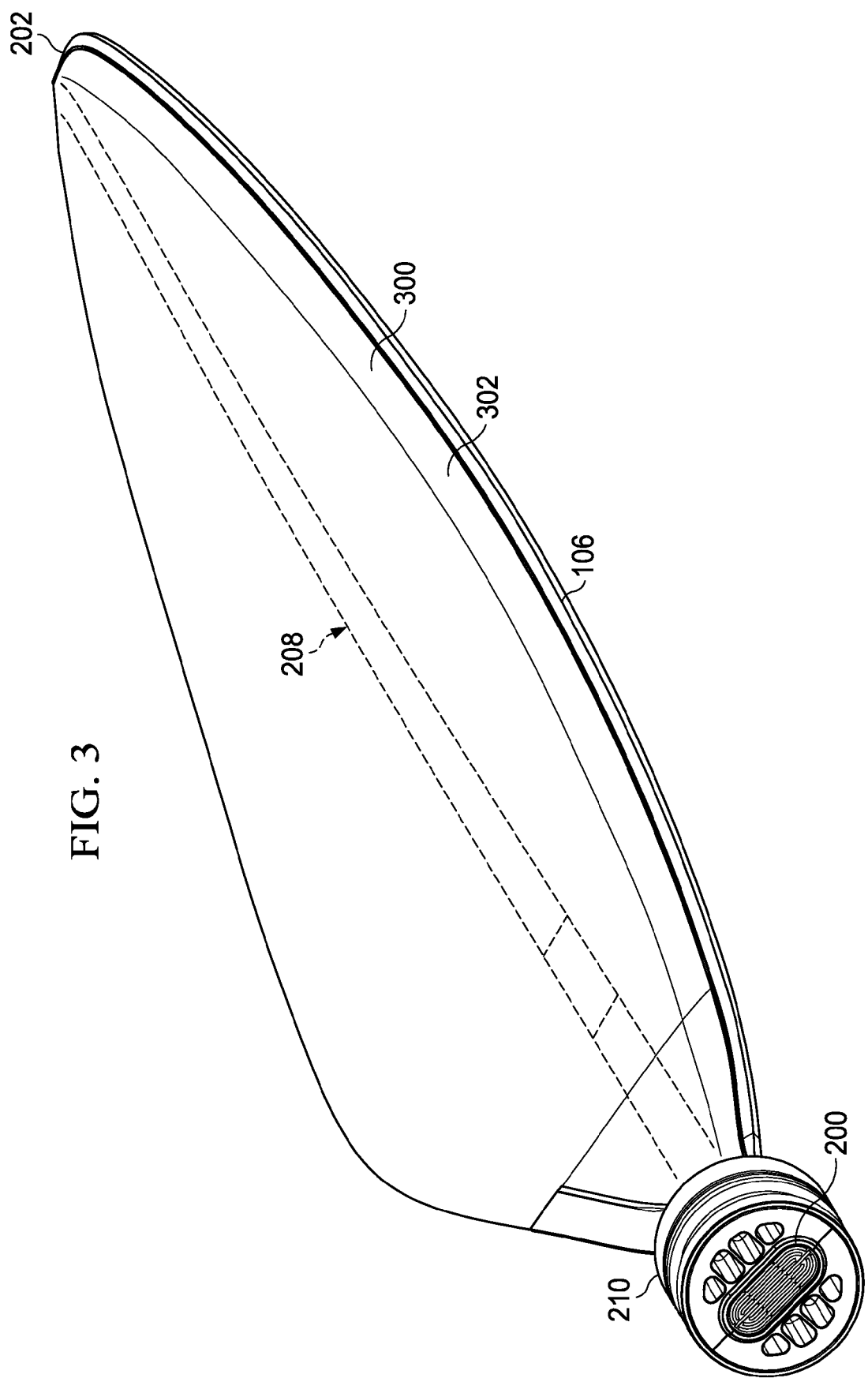
FIG. 3 is another illustration of a composite blade in accordance with an embodiment.

Turning next to FIG. 3, another illustration of a composite blade is depicted in accordance with an embodiment. In this view, second skin 300 on second side 302 of composite blade 106 is shown. Composite spar 208 also is seen in phantom in this view of composite blade 106.

Figure 4:
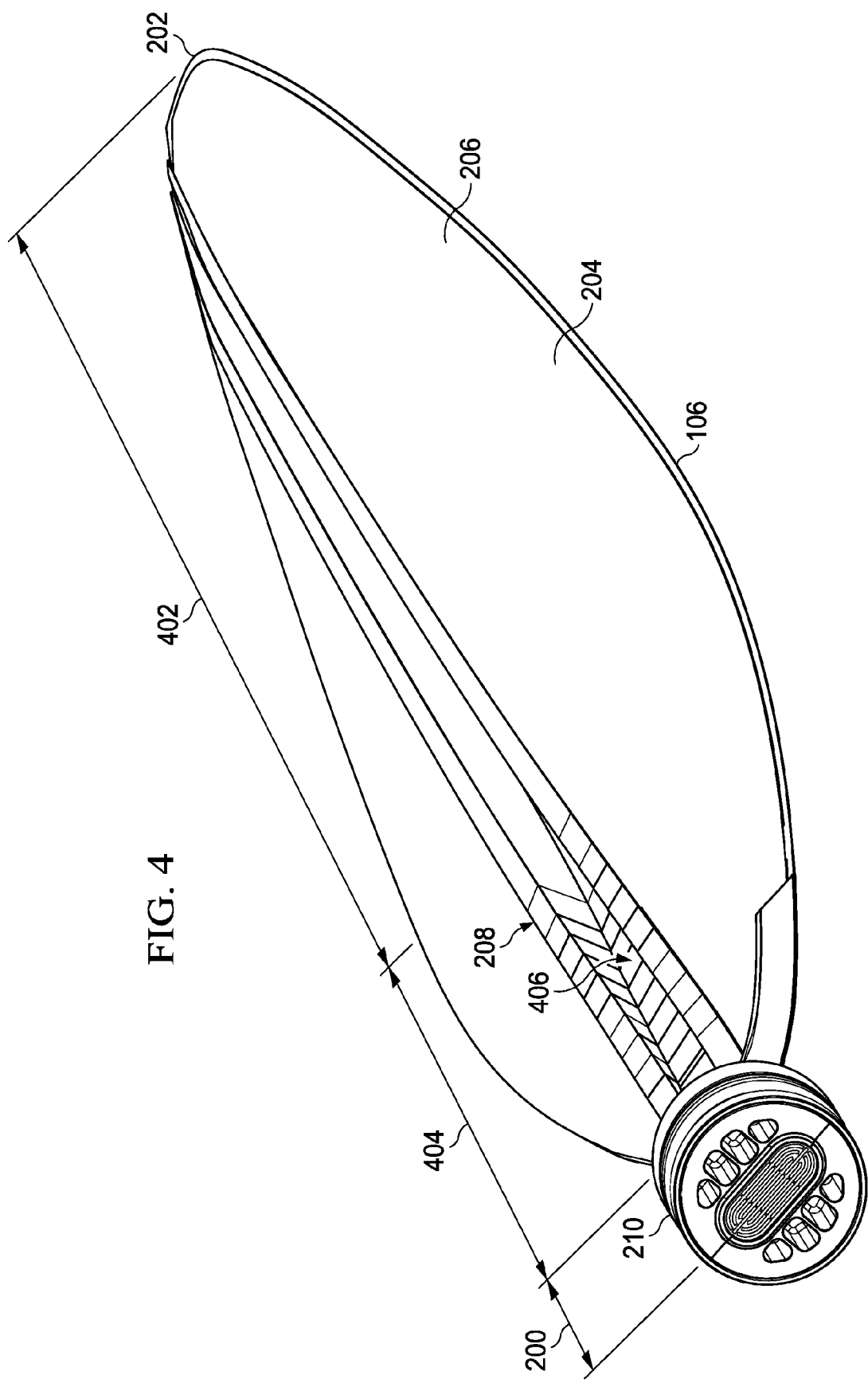
FIG. 4 is an illustration of a partially-exposed view of a composite blade with a first skin removed in accordance with an embodiment.

With reference now to FIG. 4, a partially-exposed view of a composite blade with a first skin removed is depicted in accordance with an embodiment. In this exposed view, first skin 204 has been removed to better depict composite spar 208. As can be seen in this particular example, composite spar 208 has root section 200 and main section 402. Root section 200 transitions to main section 402 through transition section 404. In the illustrative example, channel 406 extends through main section 402 and transition section 404.

Channel 406 is an open channel. In other words, a portion of channel 406 is exposed along the length of channel 406.

Root section 200 is closed and has a shape configured to be retained in collet 210. In this example, root section 200 is solid. More specifically, root section 200 may be a solid laminate. In some illustrative examples, channel 406 may extend through at least a portion of root section 200 with the other portion being solid. Channel 406 is a closed channel in root section 200. In this manner, root section 200 is closed by either being solid, having a closed channel disposed within or extended through, or both. A closed channel may be a channel with walls that enclose the channel except at one or more ends of the channel. If a closed channel is present in root section 200, foam or other material may be placed in the closed channel to fill an opening at the end of the channel. As a result, root section 200 may be sealed to reduce moisture that may enter into the interior of composite blade 106.

In this illustrative example, collet 210 is a two-piece structure that is configured to hold at least a portion of root section 200 without using fasteners. As a result, holes do not need to be drilled in root section 200.

Figure 5:
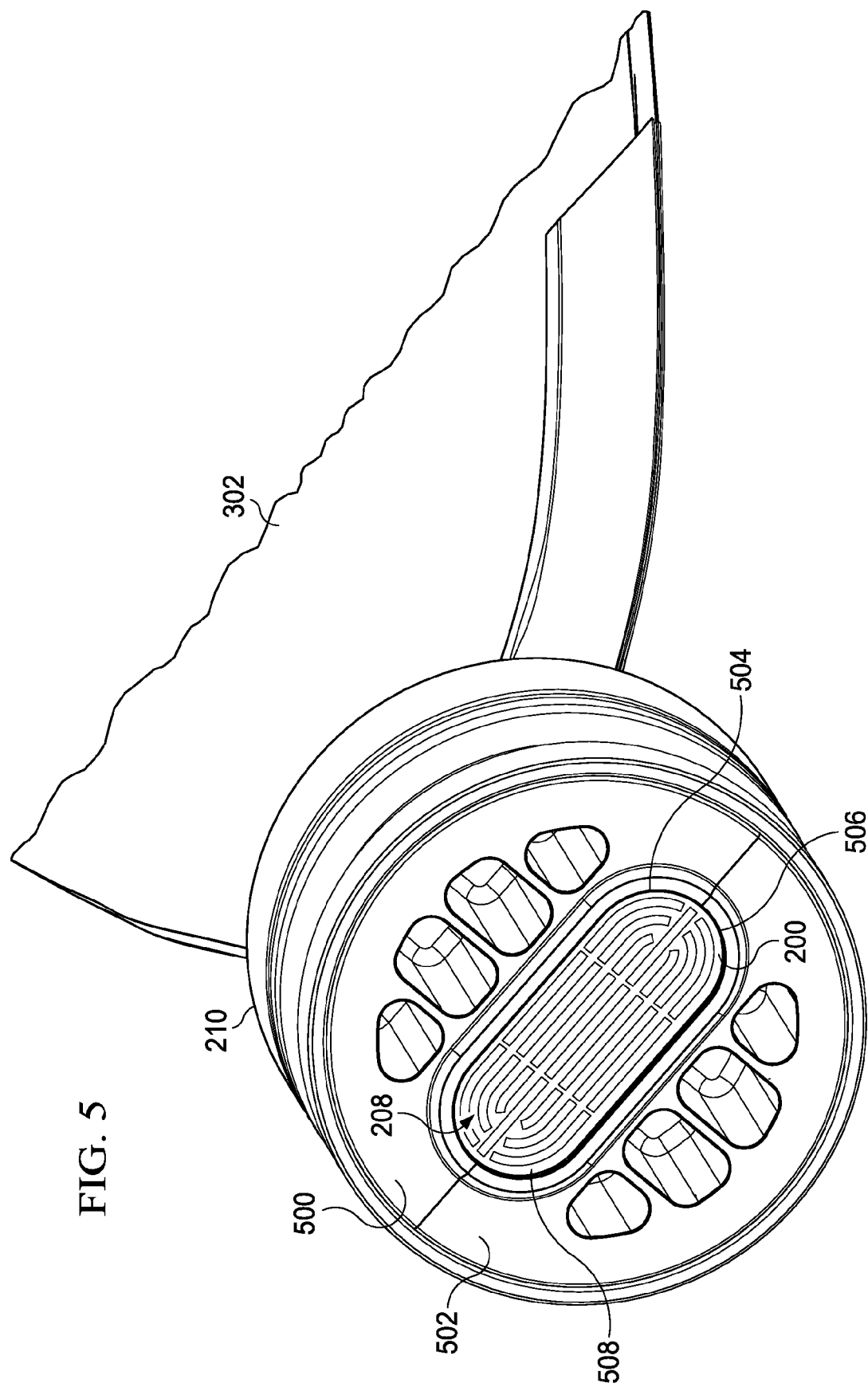
FIG. 5 is an illustration of a root section of a composite spar retained in a collet in accordance with an embodiment.

Turning now to FIG. 5, a more-detailed illustration of a root section of a composite spar retained in a collet is depicted in accordance with an embodiment. In this more-detailed view of root section 200 and collet 210, root section 200 has a shape that is configured to be held within collet 210.

Collet 210 has first piece 500 and second piece 502. These two pieces are configured to be placed around root section 200 and secured to each other to retain root section 200.

The shape of root section 200 allows composite spar 208 to be held by collet 210 without drilling holes in root section 200 of composite spar 208. Root section 200 of composite spar 208 may be held by collet 210 without using fasteners.

As depicted, collet 210 has a shape that corresponds to the shape of root section 200. For example, surface 504 in channel 506 of collet 210 has a shape that corresponds to the shape of surface 508 of root section 200. The shape of root section 200 and the corresponding shape of collect 210 may be selected to reduce undesired loads on root section 200 and on other portions of composite blade 106.

Figure 6:
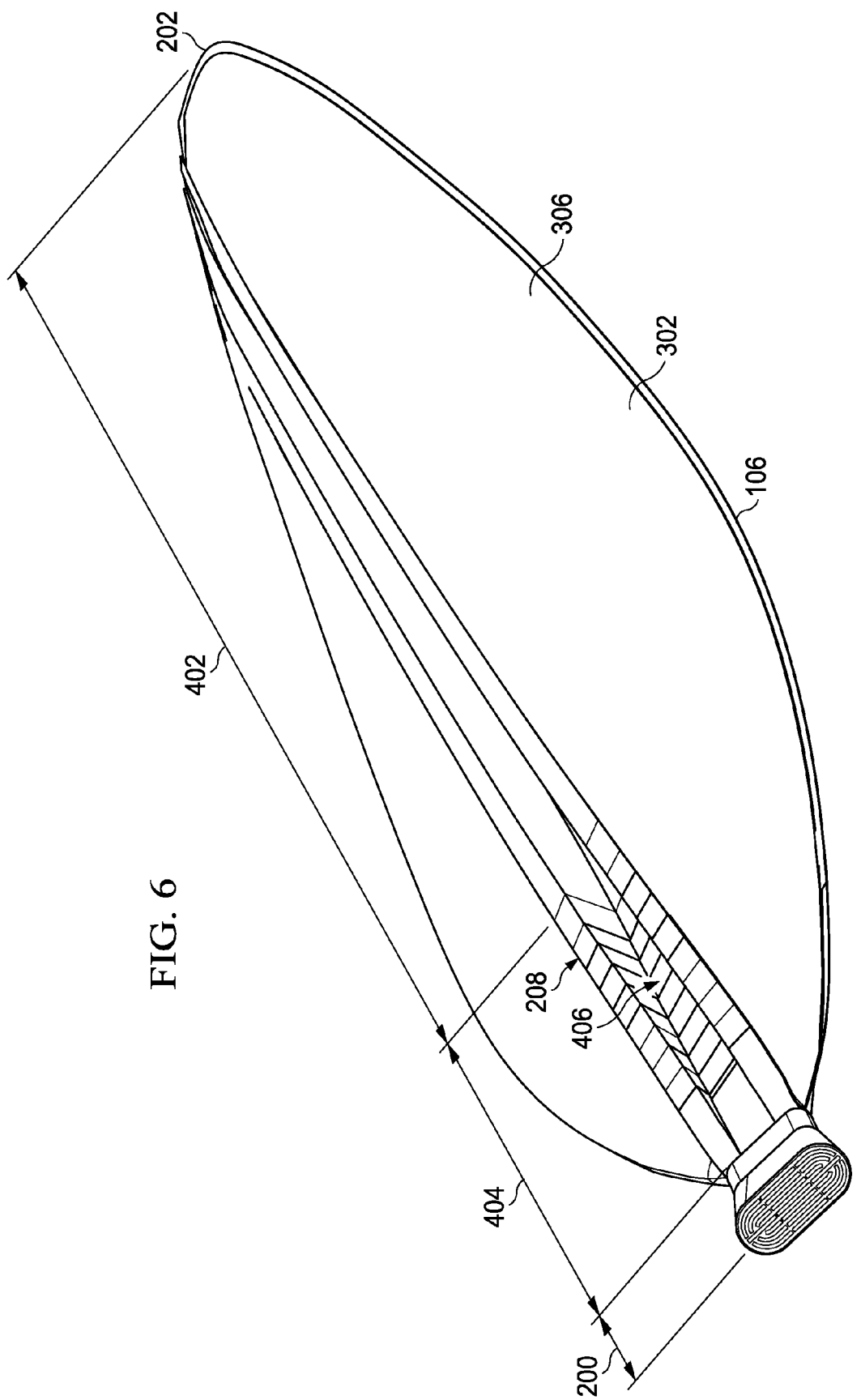
FIG. 6 is an illustration of a composite blade in accordance with an embodiment.

Turing now to FIG. 6, an illustration of a composite blade is depicted in accordance with an embodiment. In this view of composite blade 106, collet 210 has been removed from root section 200 of composite spar 208.

Figure 7:
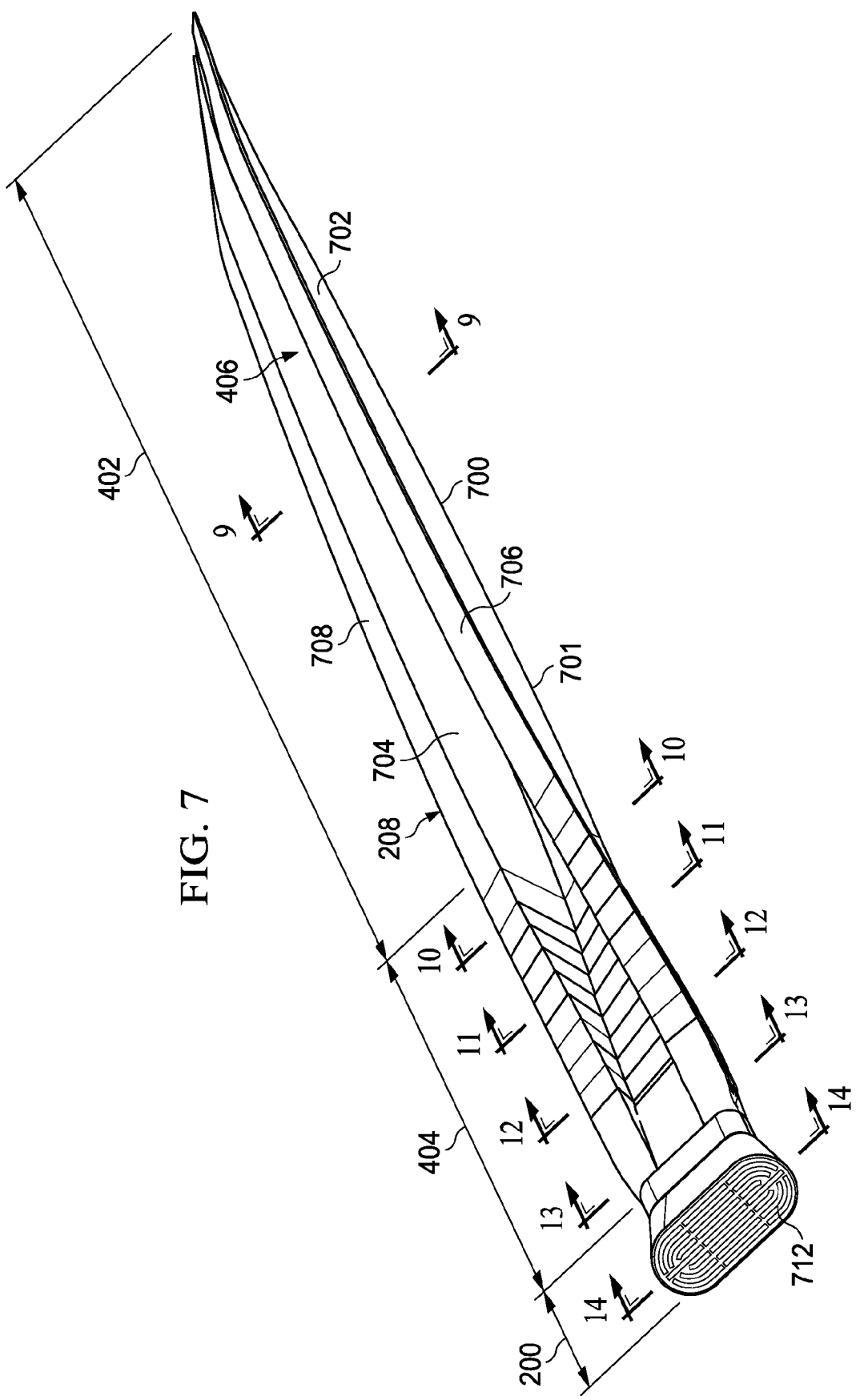
FIG. 7 is an illustration of a composite spar in accordance with an embodiment.

In FIG. 7, an illustration of a composite spar is depicted in accordance with an embodiment. In this view of side 700 of composite spar 208, composite spar 208 is a hat-shaped spar. Composite spar 208 may also be referred to as an omega-shaped spar.

As seen in this illustrative example, composite spar 208 has cap 701, first web 702, second web 704, first flange 706, and second flange 708. These components form channel 406, which extends from transition section 404 through main section 402. Channel 406 is not enclosed in this view. Channel 406 is open until second skin 300 in FIG. 3 is bonded to first skin 206 in FIG. 2. Thus, channel 406 is an open channel in this illustrative example.

Further, channel 406 decreases in size through transition section 404. Channel 406 is substantially absent in root section 200 in this particular example.

As can be seen in this illustrative example, root section 200 has wedge shape 712. Wedge shape 712 is a shape that is configured to be retained by a blade retention system, such as hub shaped assembly 112 FIG. 1.

Figure 8:
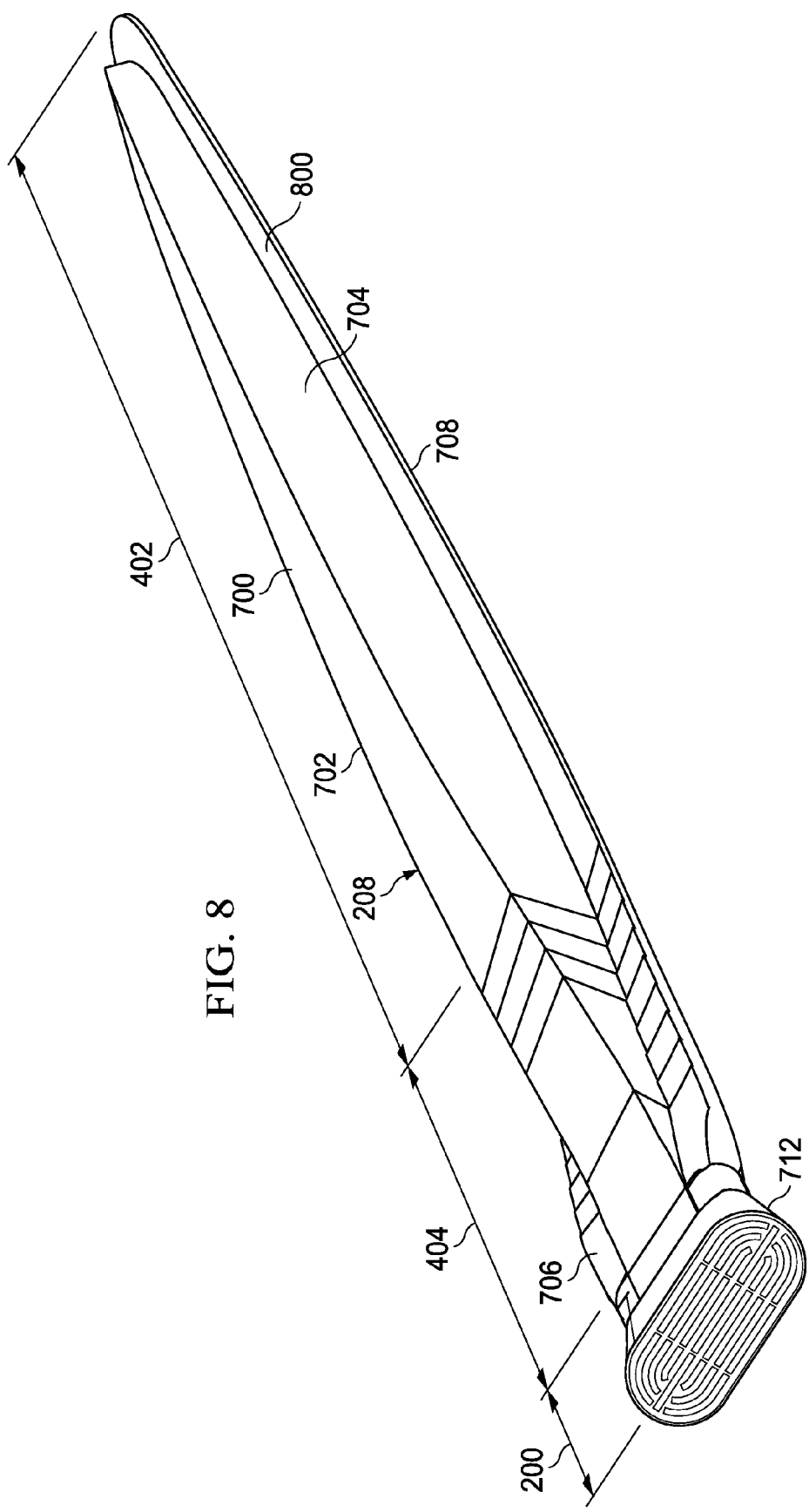
FIG. 8 is another view of a composite spar in accordance with an embodiment.

Turning next to FIG. 8, another view of a composite spar from an opposite side of the composite part shown in FIG. 7 is depicted in accordance with an embodiment. In this illustrative view, side 800 of composite spar 208 is depicted.

Turning next to FIGS. 9-14, illustrations of cross-sectional views of a composite spar are depicted in accordance with an embodiment. These cross-sectional views are taken along different sections of composite spar 208 in FIG. 7. The cross-sectional views illustrate layers of composite material along different sections of composite spar 208.

Figure 9:
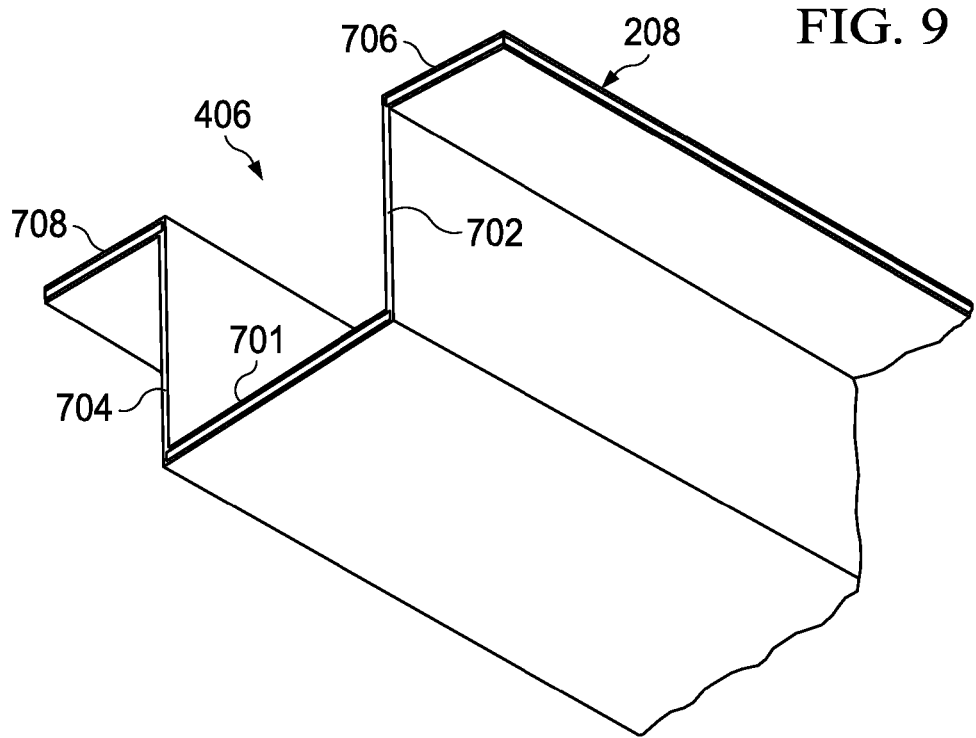
FIGS. 9-14 are illustrations of cross-sectional views of a composite spar in accordance with an embodiment.

Turning first to FIG. 9, a cross-sectional view of main section 402 in composite spar 208 is depicted in accordance with an embodiment. In this illustrative example, the cross-sectional view of composite spar 208 is taken along lines 9-9 in FIG. 7. This cross-sectional view is located in main section 402 of composite spar 208.

Figure 10:
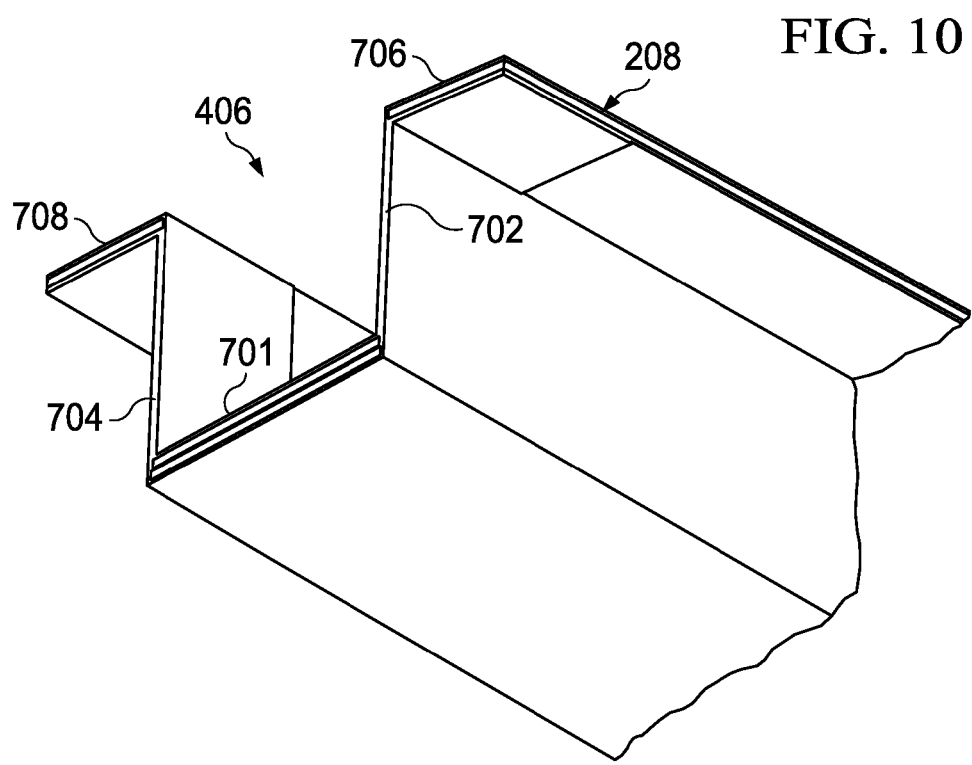

Next, in FIG. 10, a cross-sectional view of composite spar 208 is seen taken along lines 10-10 in FIG. 7. This cross-sectional view is also located in transition section 404 of composite spar 208.

Figure 11:
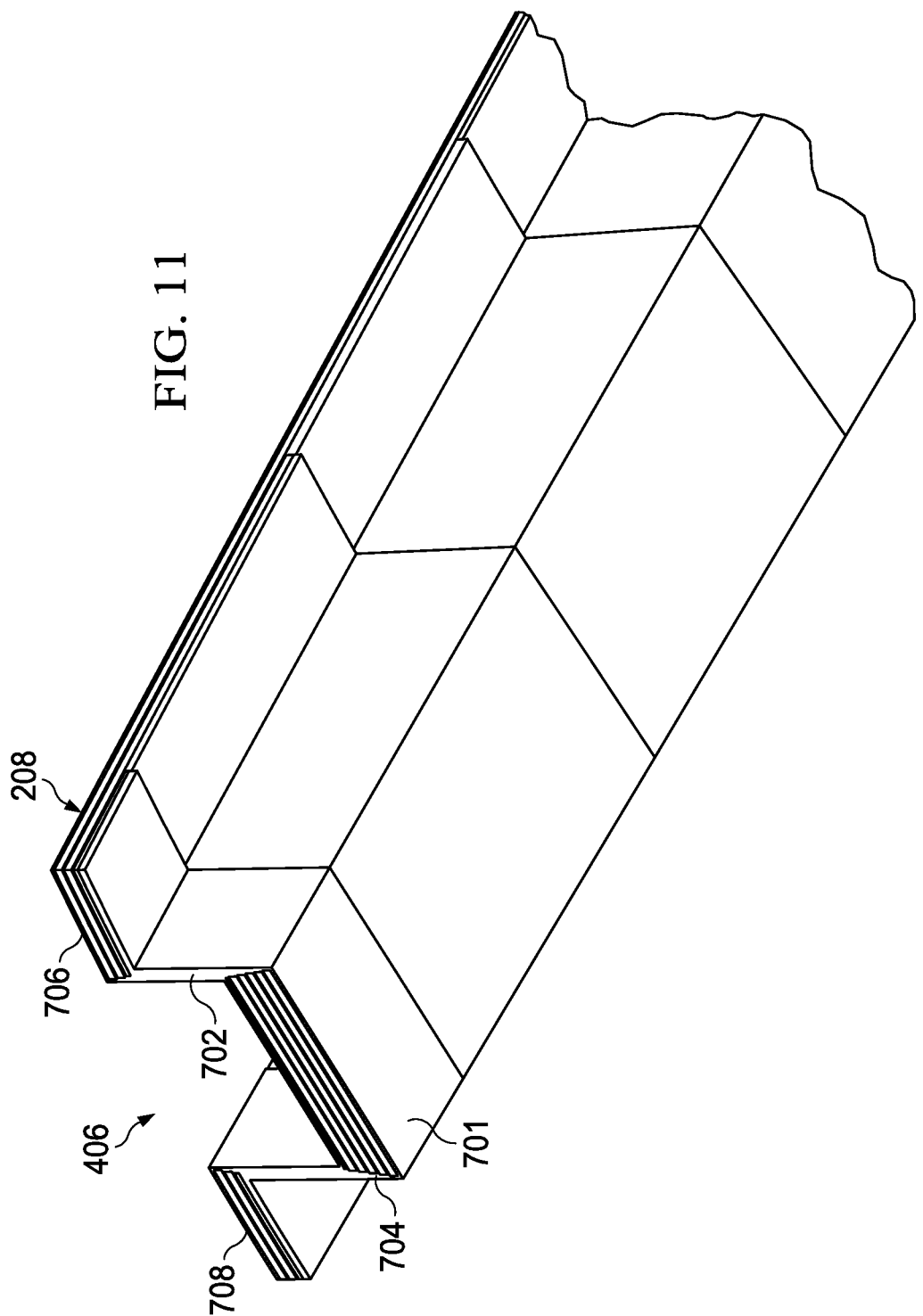

In FIG. 11, a cross-sectional view of transition section 404 in composite spar 208 is depicted in accordance with an embodiment. In this illustrative example, a cross-sectional view of composite spar 208 in transition section 404 is shown taken along lines 11-11 in FIG. 7.

Figure 12:
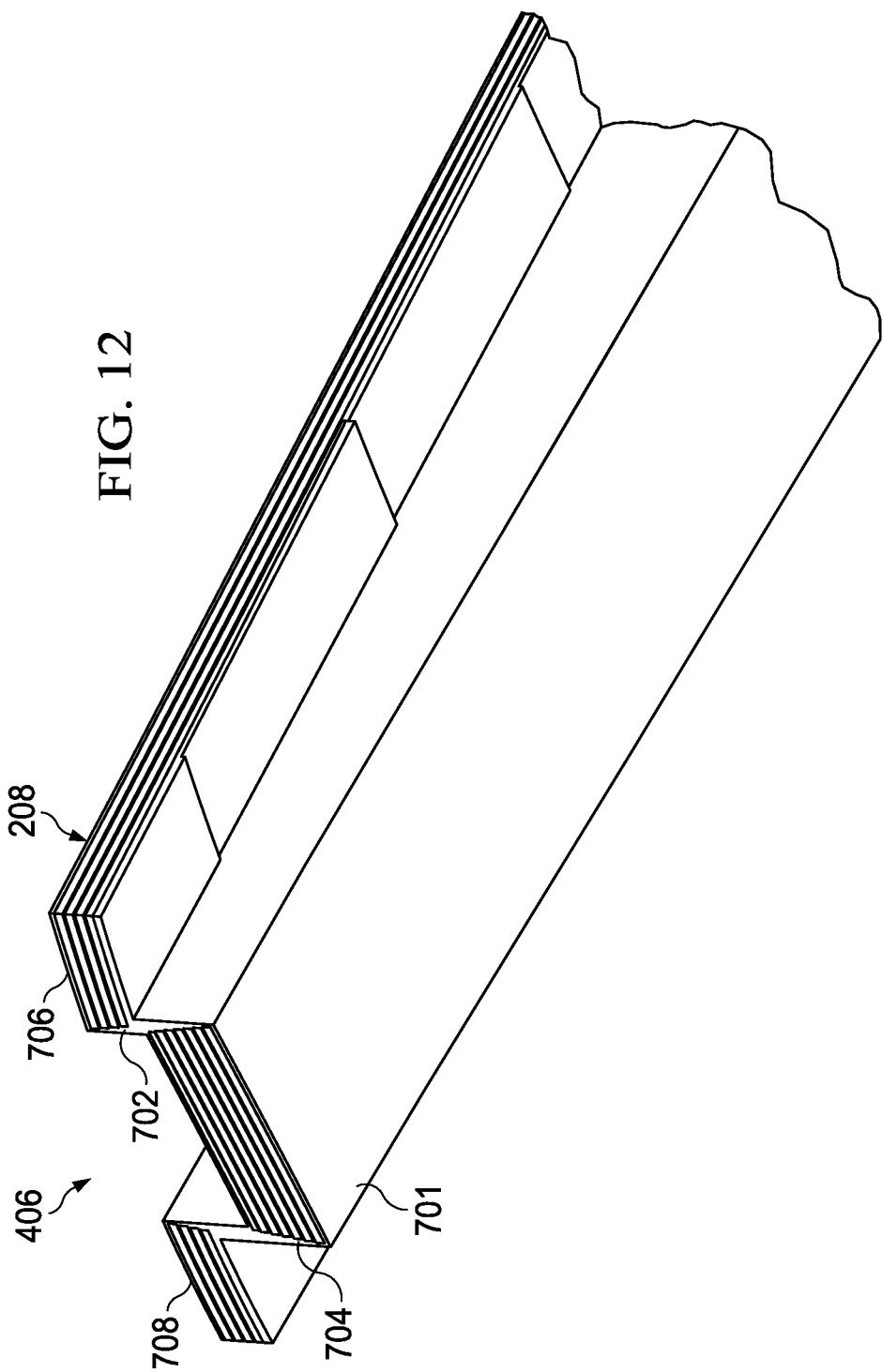

Another cross-sectional view of composite spar 208 in transition section 404 is depicted in accordance with an embodiment in FIG. 12. In this view, a cross-sectional view of composite spar 208 taken along lines 12-12 in FIG. 7 is shown.

Figure 13:
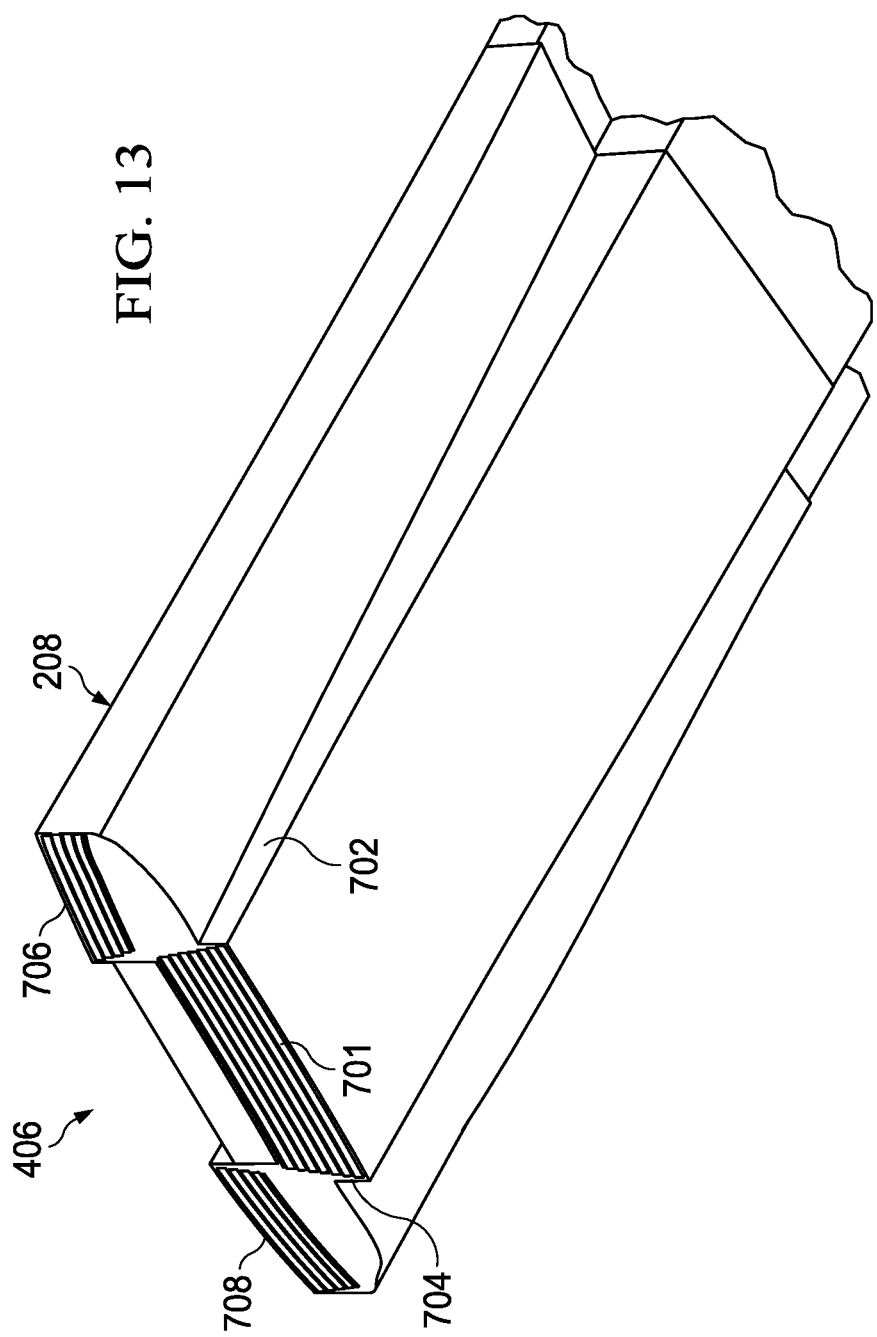

Next, in FIG. 13, a cross-sectional view of composite spar 208 in transition section 404 is depicted in accordance with an embodiment. In this figure, a cross-sectional view of composite spar 208 is seen taken along lines 13-13 in FIG. 7.

Figure 14:
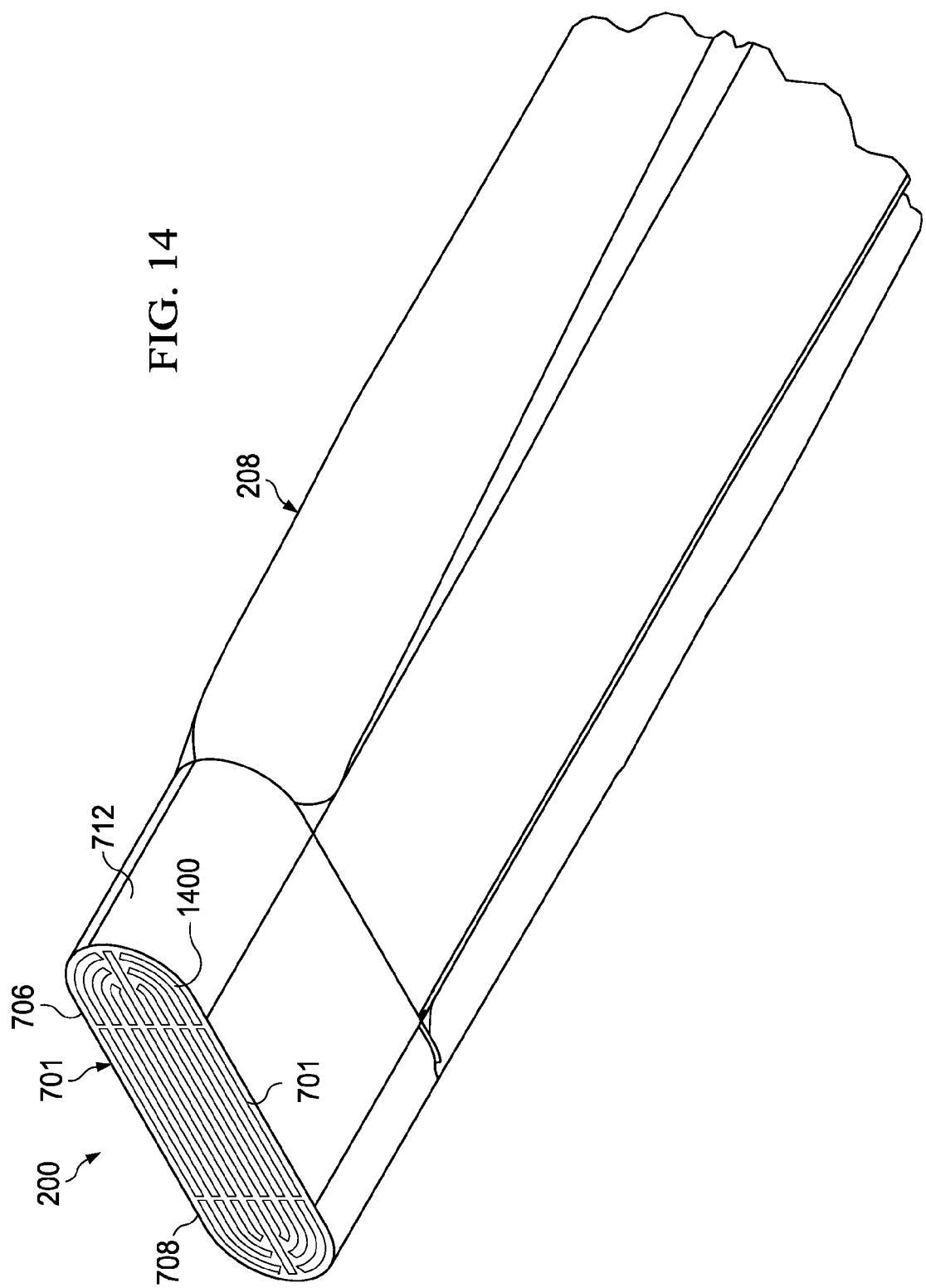

In FIG. 14, a cross-sectional view of composite spar 208 in root section 200 is depicted in accordance with an embodiment. In this illustration, composite spar 208 is seen in a cross-sectional view taken along lines 14-14 in root section 200 in FIG. 7. As can be seen in this view, composite layers for first flange 706 and second flange 708 are folded over in root section 200. In this particular example, the composite layers may include layers that take the form of unidirectional plies and layers that are weave plies. Weave plies, may be, for example, without limitation, about 45 degrees. For example, composite layers for cap 701, first flange 706, and second flange 708 may include unidirectional plies that are interleaved with other weave plies to form solid section 1400 for composite spar 208.

Figure 15:
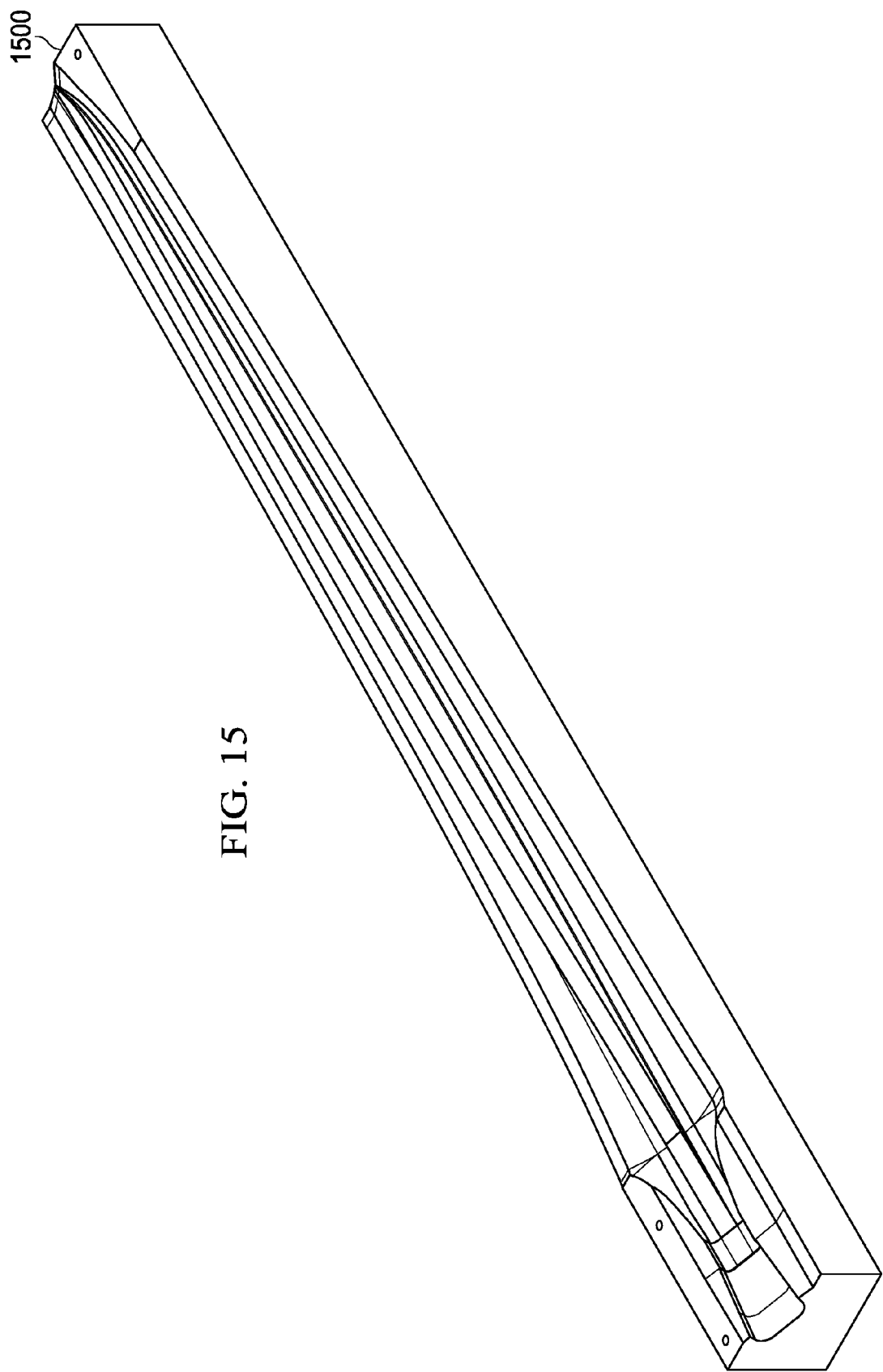
FIG. 15 is an illustration of a mold for manufacturing a composite spar in accordance with an embodiment.

Turning now to FIG. 15, an illustration of a mold for manufacturing a composite spar is depicted in accordance with an embodiment. In this illustrative example, mold 1500 is an example of a mold on which layers of composite material may be laid up to form a composite spar, such as composite spar 208 in FIG. 2.

Figure 16:
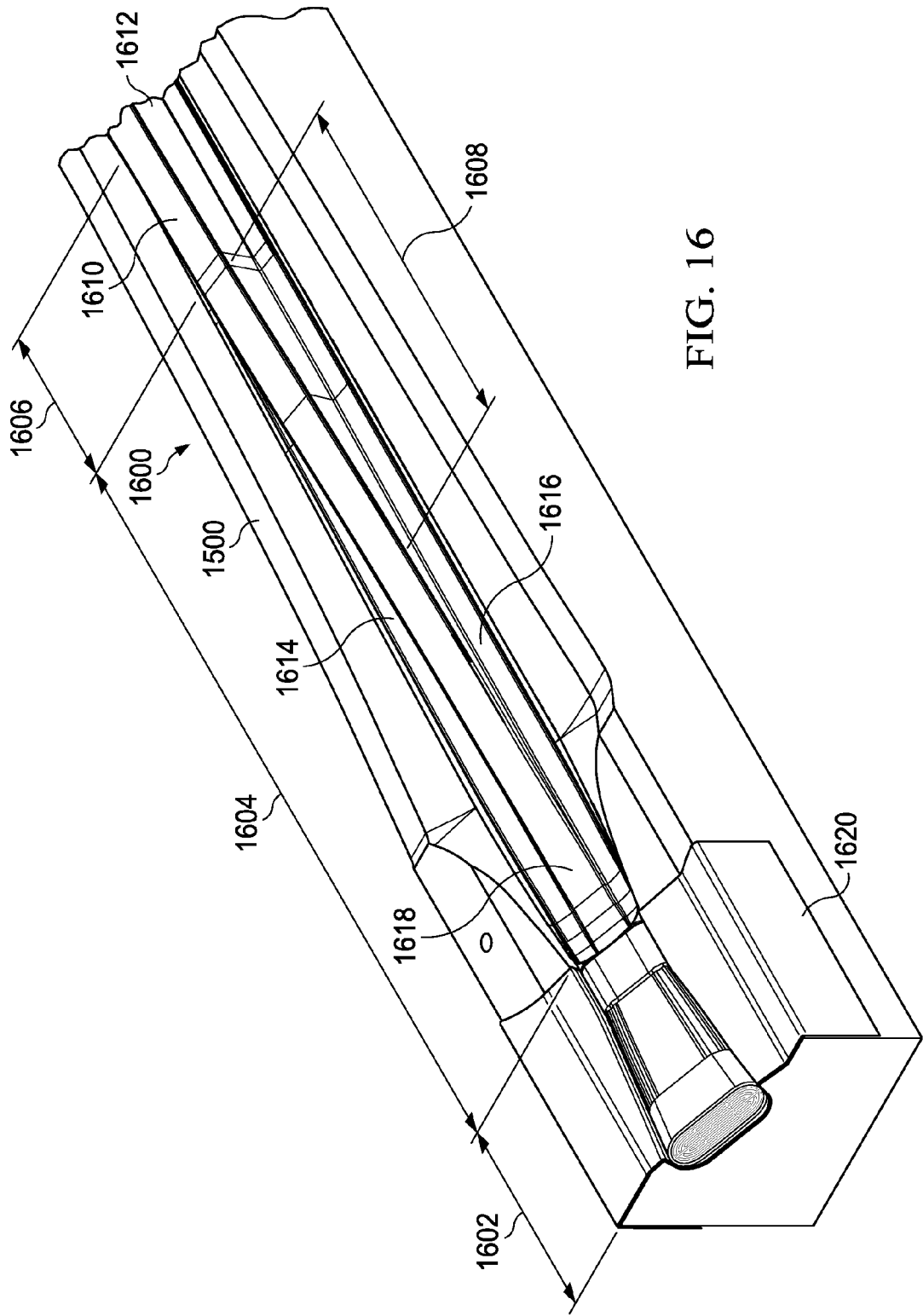
FIG. 16 is an illustration of layers of composite material laid up on a mold for a composite spar in accordance with an embodiment.

Turning now to FIG. 16, an illustration of layers of composite material laid up on a mold for a composite spar is depicted in accordance with an embodiment. In this illustrative example, layers of composite material 1600 are laid up on mold 1500.

Layers of composite material 1600 are laid up on mold 1500 to form composite spar 208 in FIG. 2. As can be seen, section 1602 of layers of composite material 1600 is for a root section of the composite spar. Section 1604 is for a transition section of the composite spar. Section 1606 is for a main section of the composite spar.

As can be seen in section 1608, unidirectional plies become shorter on first flange 1616 and second flange 1618. In contrast, the unidirectional plies for cap 1610 become longer as more layers of composite material 1600 are added onto mold 1500.

In this illustrative example, layers of composite material 1600 are laid up to form cap 1610, first web 1612, second web 1614, first flange 1616, and second flange 1618 for a composite spar.

As depicted, layers of composite material 1600 includes layer 1620, for section 1602. Layer 1620 is a weave ply that may be used to increase a thickness of section 1602. Layer 1620 is still laid open, in this example, and may be folder over in section 1602.

Figure 17:
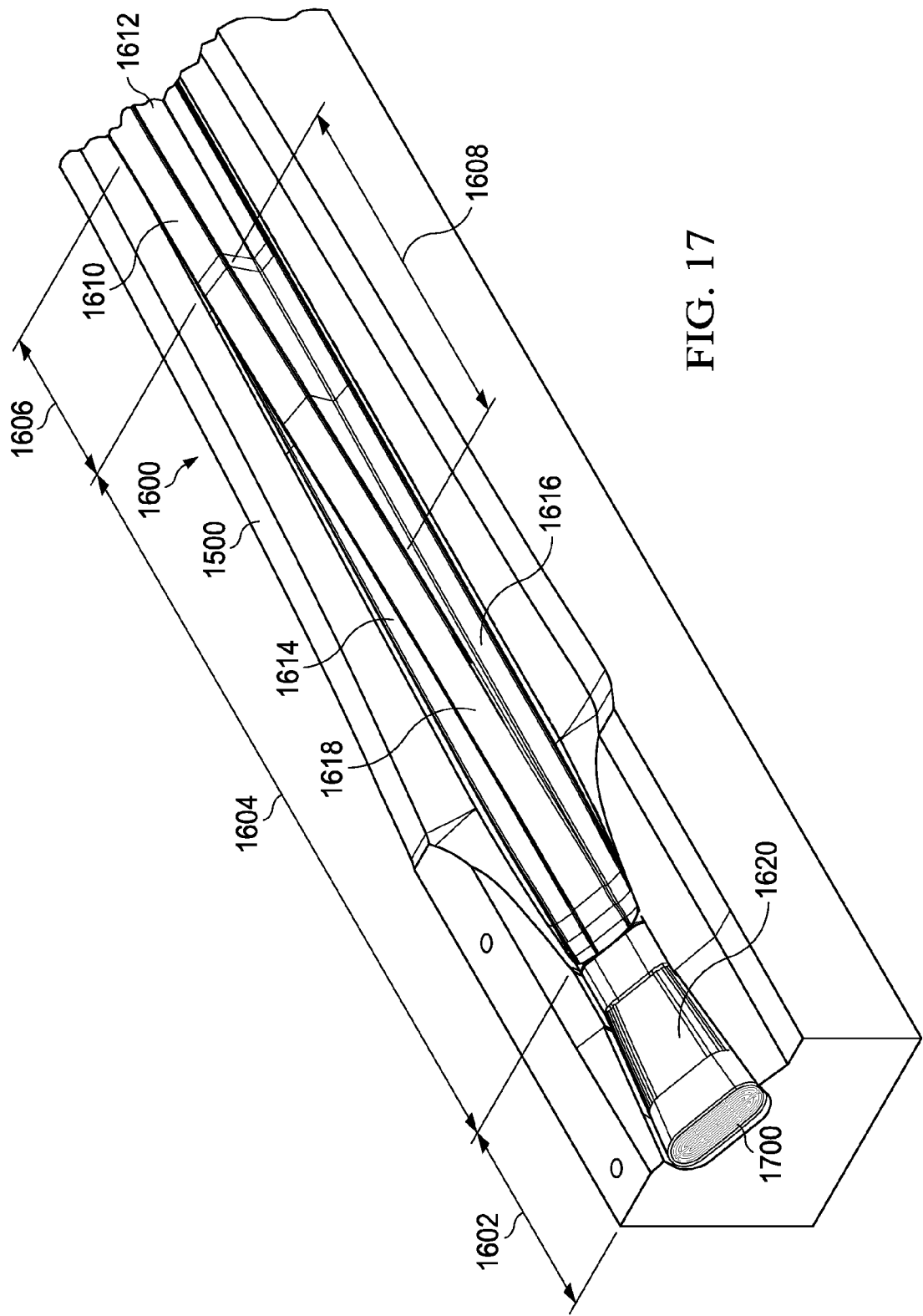
FIG. 17 is an illustration of layers of composite material for a composite spar on a mold in accordance with an embodiment.

Turning now to FIG. 17, an illustration of layers of composite material for a composite spar on a mold is depicted in accordance with an embodiment. In this illustrative example, portions of layers of composite material 1600 on mold 1500 in section 1602 have been folded over to form closed section 1700. Of course, other layers of composite material that are not folded may be added, depending on thickness requirements.

Figure 18:
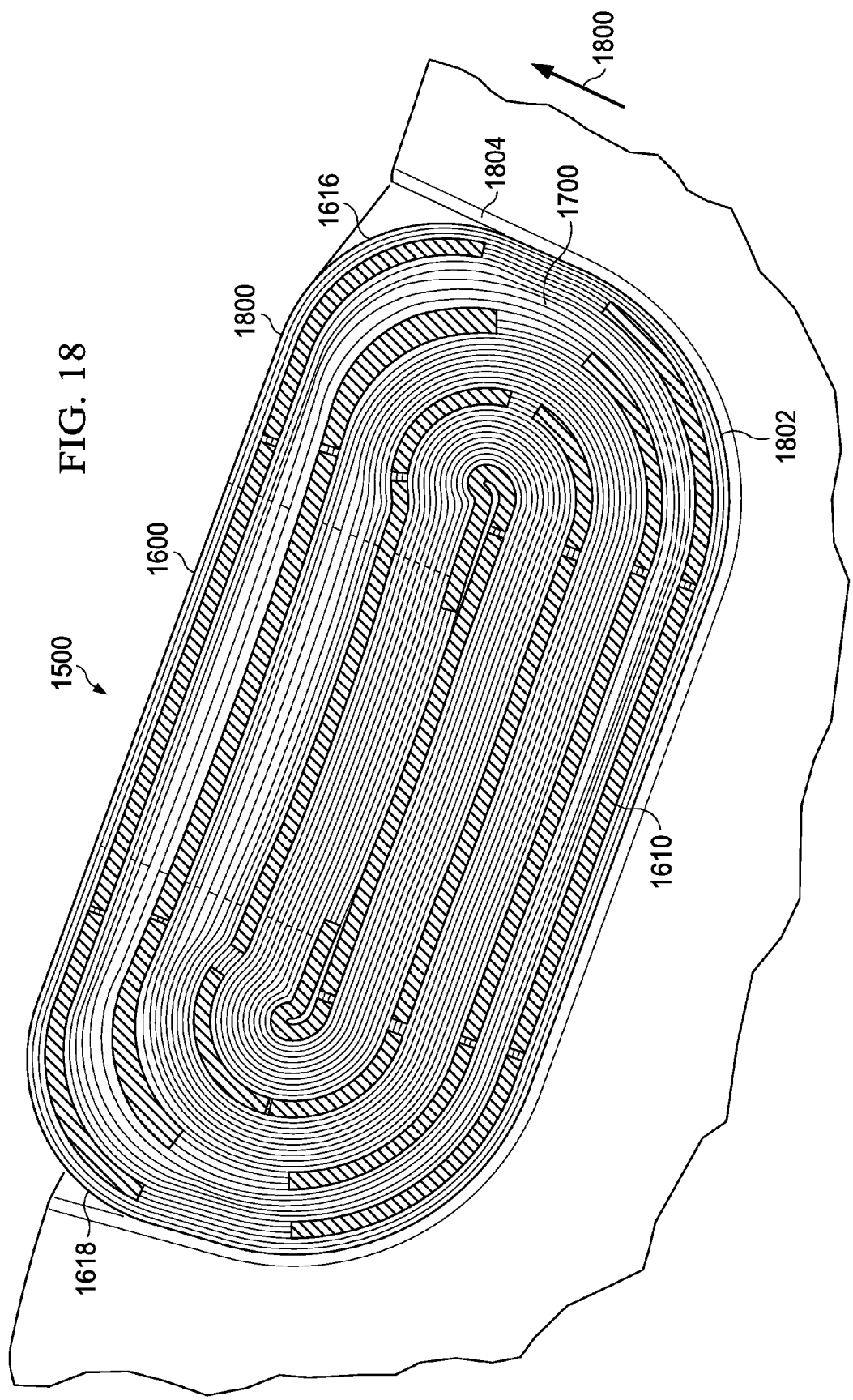
FIG. 18 is another illustration of composite layers laid up on a mold for a composite spar in accordance with an embodiment.

Turning now to FIG. 18, another illustration of composite layers laid up on a mold for a composite spar is depicted in accordance with an embodiment. In this view of mold 1500 and layers of composite material 1600, closed section 1700 can be seen in more detail.

In these illustrative examples, layers of composite material 1600 are comprised of weave plies and unidirectional plies. As depicted, the weave plies may be interspersed between groups of unidirectional plies. The weave plies may be oriented in a plus 45 degree, a zero degree, a minus 45 degree, and/or some other suitable angle relative to the length of the blade. The zero direction may be a direction parallel to the length of the blade. In these illustrative examples, the unidirectional plies have an orientation in the zero direction of the blade.

Unidirectional plies, in these illustrative examples, may only be comprised of fibers aligned in a single direction. These fibers may extend the length of the ply. The length of unidirectional plies may be selected to have a desired level of axial stiffness, strength, or a combination of the two.

In these illustrative examples, the plies may be laid up from surface 1802 of mold 1500 in the direction of arrow 1800. In laying up the plies in layers of composite material 1600, the first half of the weave plies laid up in the direction of arrow 1800 is a first number of weave plies. The second half of the weave plies laid up in the direction of arrow 1800 are a second number of weave plies that are on top of the first number of weave plies. The first number of weave plies may be left unfolded. While the second half of the weave plies are laid up in the direction of arrow 1800, the first number of weave plies may be folded over as each of the second number of weave plies are laid down. The first number of weave plies is folded over in a reverse order from how they were laid up to form a shape.

For example, when a weave ply in the second number of weave plies is laid up, a weave ply in the first number of weave plies is folded over. Alternatively, two or more weave plies in the first number of weave plies may be folded over when one or more of the second number of weave plies is laid up. The shape is wedge shape 1804 and has closed section 1700 as depicted in this illustrative example.

Figure 19:
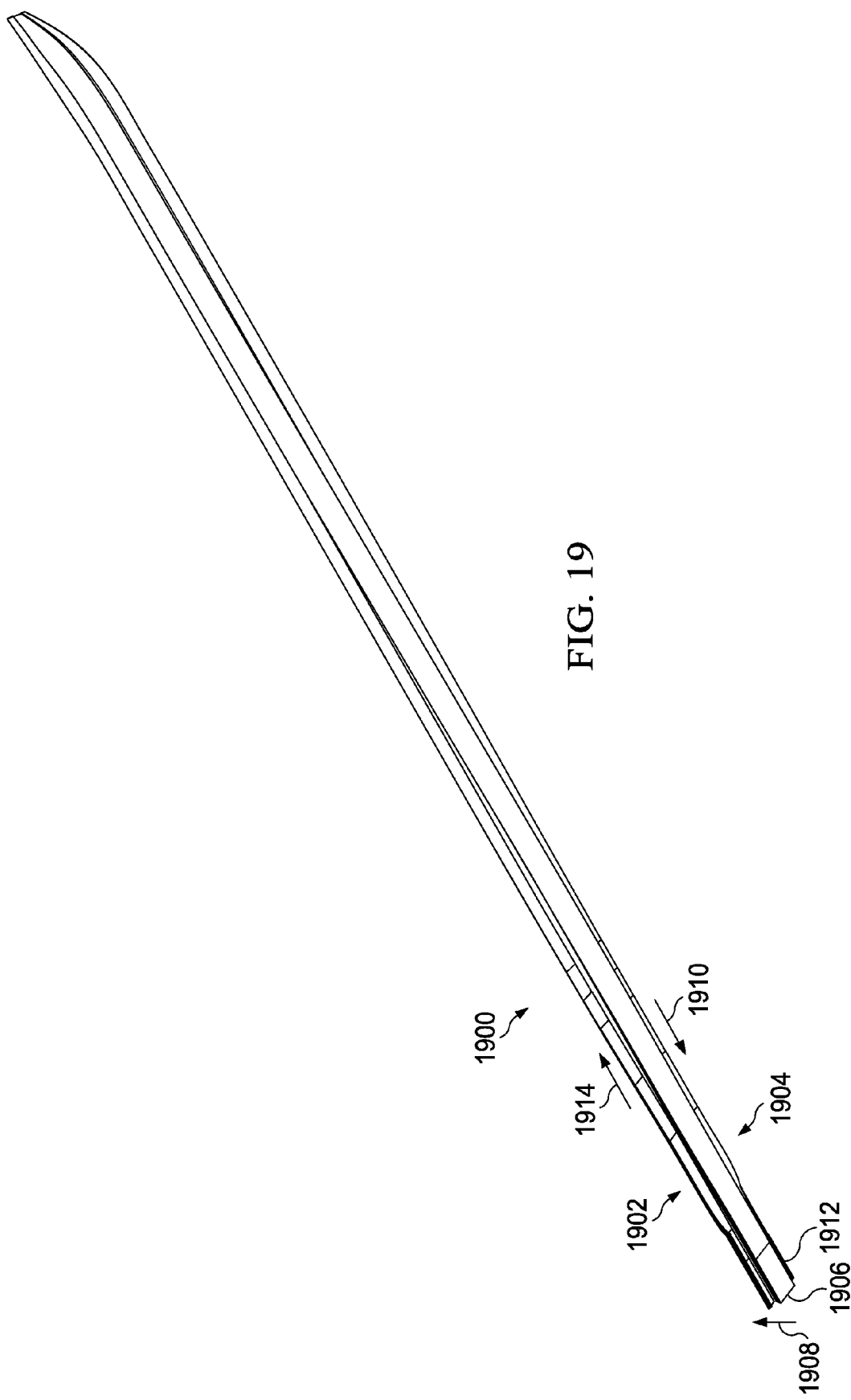
FIG. 19 is an illustration of layers in the form of unidirectional plies for a composite spar in accordance with an embodiment.

Turning next to FIG. 19, an illustration of unidirectional plies for a composite spar is depicted in accordance with an embodiment. In this illustrative example, unidirectional plies 1900 are layers of composite material that contribute to providing desired properties for a composite spar. For example, unidirectional plies 1900 may be configured to provide desired properties, such as, for example, strength, stiffness, and other desirable properties.

Unidirectional plies 1900 may be laid up for a composite spar. As depicted, unidirectional plies 1900 comprise unidirectional plies 1902, unidirectional plies 1904, and unidirectional plies 1906.

Unidirectional plies 1902 and unidirectional plies 1904 are for a first flange and a second flange in the composite spar. Unidirectional plies 1906 are for a cap in the composite spar.

In this illustrative example, unidirectional plies 1900 are laid up in the direction of arrow 1908. As can be seen, as more layers of composite material are laid up, unidirectional plies 1902 and unidirectional plies 1904 become shorter in the direction of arrow 1910 towards root 1912. In contrast, unidirectional plies 1906 for the cap become longer in the direction of arrow 1914.

Unidirectional plies 1900, in combination with layers of composite material typically used for a composite spar, such as weave plies, may provide a desired stiffness for the composite spar. In other words, as more unidirectional plies 1900 are present, the stiffness may increase.

If a change in the stiffness gradient along the blade length is desired, the length of unidirectional plies 1900 may be extended in the direction of arrow 1914 or shortened in the direction of arrow 1910 for different layers. For example, unidirectional plies may not be shortened as much in the direction of arrow 1910 farther up in the stack of unidirectional plies 1900 in the direction of arrow 1908. Unidirectional layers may be extended in the direction of arrow 1914.

Figure 20:
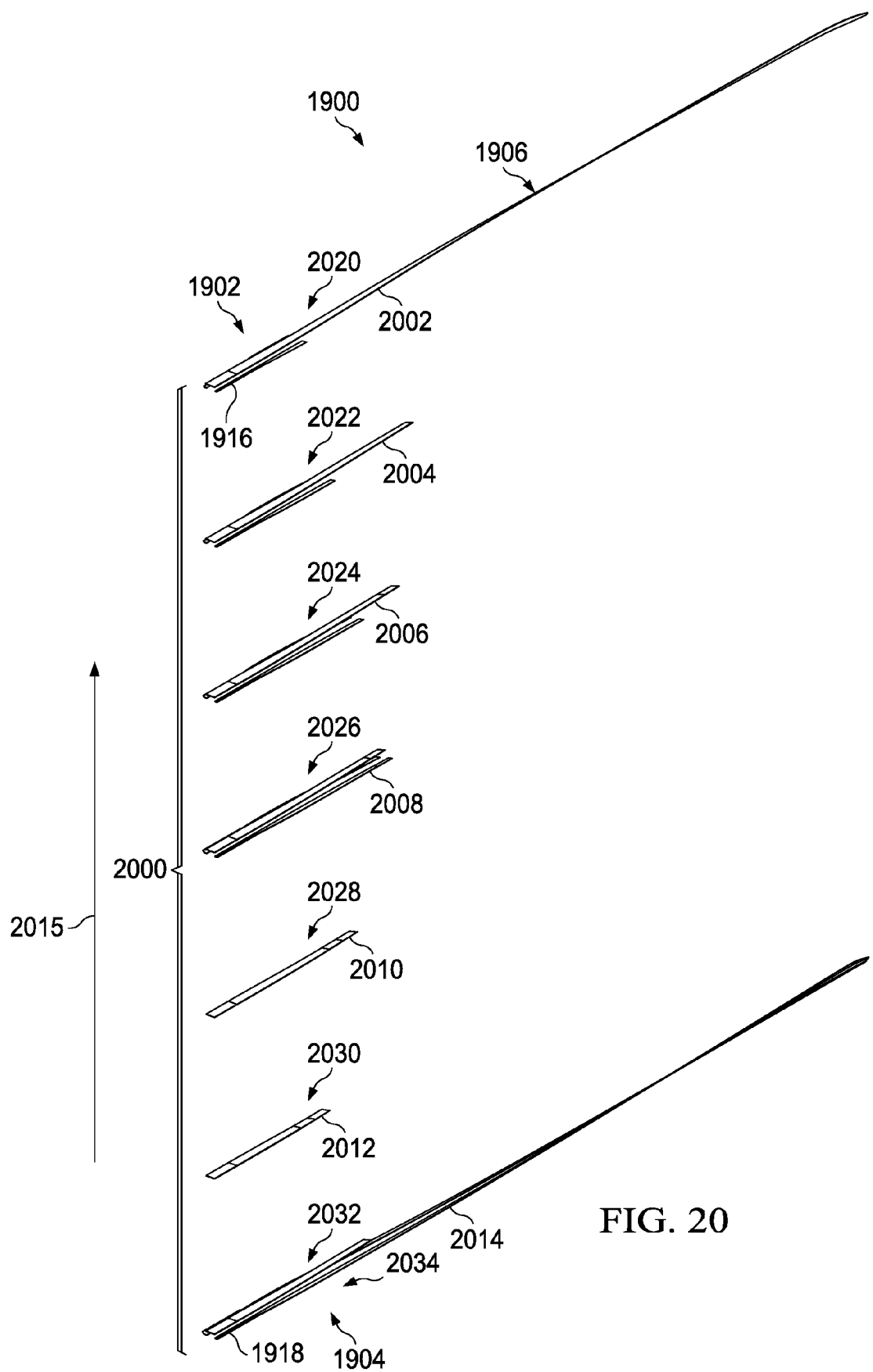
FIG. 20 is an illustration of an exploded view of layers in accordance with an embodiment.

With reference now to FIG. 20, an exploded view of unidirectional layers of FIG. 19 are depicted in accordance with an embodiment. In this exploded view, unidirectional plies 1900 are shown in groups of unidirectional plies 2000.

In this illustrative example, groups of unidirectional plies 2000 comprise groups 2002, 2004, 2006, 2008, 2010, 2012, and 2014. As depicted, these groups are laid up in the direction of arrow 2015. Each group may have some number of layers of unidirectional material. For example, a group may have about six plies, about seven plies, about eight plies, or some other number of plies. Further, each group may have different numbers of layers as compared to other groups.

Other layers of composite material for the composite spar may be laid up on top of, below, or between groups 2008 of composite layers. For example, weave plies may be placed in locations 2020, 2022, 2024, 2026, 2028, 2030, 2032, and 2034. In these illustrative examples, weave plies placed at location 2020 and location 2034 may form the top and bottom skins or close-out plies for the composite spar.

Weave layers placed in these different locations may have different numbers of layers. For example, the layers may be one, three, five, six, or some other suitable number of layers depending on the particular implementation and thickness requirements. The shapes for these weave layers may vary, depending on the location and the stack up of composite materials.

Figure 21:
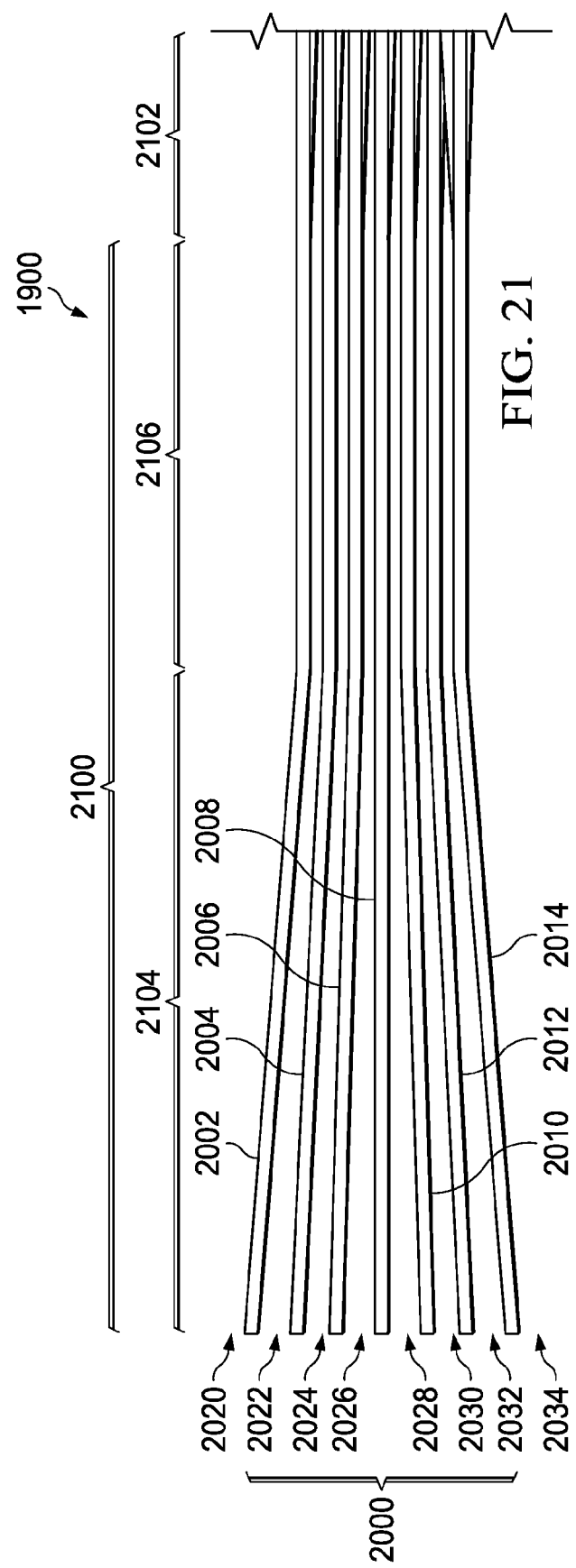
FIG. 21 is an illustration of groups of second type of layers at a root of the composite spar in accordance with an embodiment.

In FIG. 21, an illustration of groups of second type of layers at a root of the composite spar is depicted in accordance with an advantageous embodiment. In this illustrative example, a side view of groups 2002, 2004, 2006, 2008, 2010, 2012, and 2014 of unidirectional plies 1900 is depicted in accordance with an advantageous embodiment. As can be seen in this side view, unidirectional plies 1900 have root section 2100 and transition section 2102.

Within root section 2100, wedge shape 2104 is present along with neck 2106. Wedge shape 2104 may be formed by additional weave plies being placed in locations 2020, 2022, 2024, 2026, 2028, 2030, 2032, and 2034. In this manner, groups 2002, 2004, 2006, 2008, 2010, 2012, and 2014 of groups of unidirectional plies 2000 fan out to form wedge shape 2104. Wedge shape 2104 is the portion of the spar that may be retained in a blade retention system. In particular, wedge shape 2104 may be retained in a collet that is part of a blade retention system in these illustrative examples.

Figure 22:
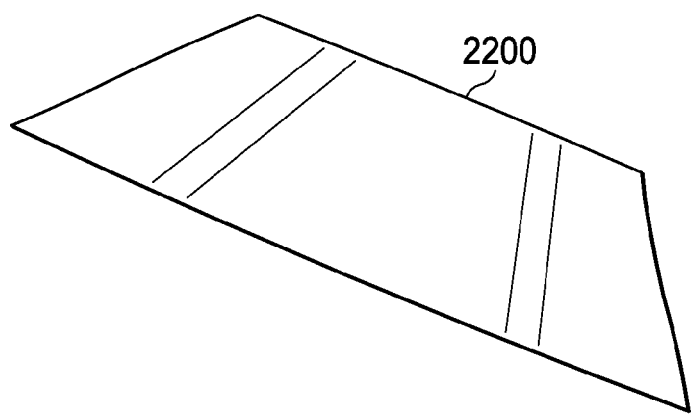
FIGS. 22-24 are illustrations of shapes for layers that may be used with layers of unidirectional plies in accordance with an embodiment.
Figure 23:
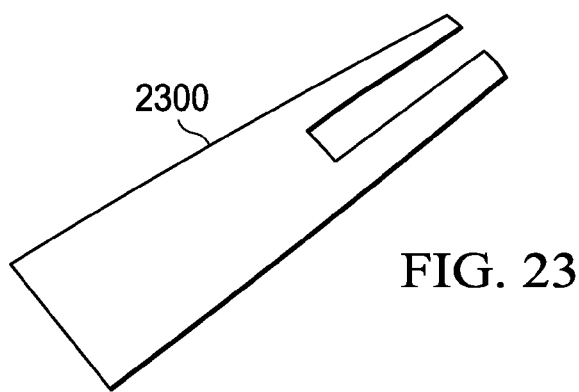
Figure 24:
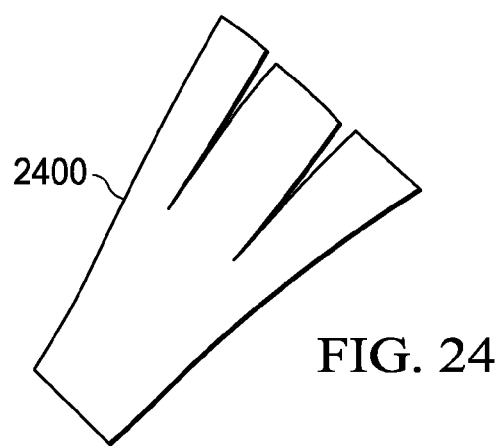

With reference now to FIGS. 22-24, illustrations of shapes for layers of composite material are depicted in accordance with an embodiment. In these illustrative examples, FIGS. 22-24 illustrate shapes of composite materials for weave layers that may be placed between unidirectional plies, such as those illustrated in FIGS. 19 and 20. The different shapes illustrated in FIGS. 22-24 may be weave plies that have orientations, such as plus 45 degrees, zero degrees, minus 45 degrees, or other orientations. These weave plies may be used to increase the thickness of a wedge section and to cover the unidirectional plies as described above.

In the illustrative example in FIG. 22, shape 2200 is an example of a shape for a weave ply that may be used to increase a thickness of a root section of a composite spar. In particular, shape 2200 may be used to build up the thickness in forming a wedge shape for the root section. For example, shape 2200 is an example of a shape for layer 1620 in FIG. 16.

In this illustrative example, shape 2200 is a shape used for layers that may be folded over to form the wedge shape. In the illustrative examples, the first number of layers laid up using shape 2200 and the second number of layers may be laid up on top of the first number of layers. The first number of layers laid up using shape 2200 may now be folded over to form the wedge shape for the spar.

Shape 2300 in FIG. 23 is an example of a shape for a weave ply that may be placed between layers of unidirectional plies. For example, weave plies having shape 2300 may be used in locations 2020, 2022, 2024, 2026, 2028, 2030, 2032, and 2034 between groups of unidirectional plies 2000 in FIG. 20.

In FIG. 24, shape 2400 is an example of a shape for a weave ply that may be used to increase the thickness of a transition section in the composite spar.

In these illustrative examples, shapes 2200, 2300, and 2400 are examples of shapes for weave plies that may be placed on unidirectional plies that have been placed down. The illustration of unidirectional plies and weave plies in FIGS. 19-24 are not meant to imply physical or architectural limitations to the manner in which different layers may be shaped or placed down. For example, other shapes of weave plies may be used other than shapes 2200, 2300, and 2400. Further, other numbers of groups of unidirectional plies may be used other than the seven groups illustrated in FIGS. 20 and 21. For example, three groups, eight groups, or some other number of groups of unidirectional plies may be used, depending on the particular implementation.

Figure 25:
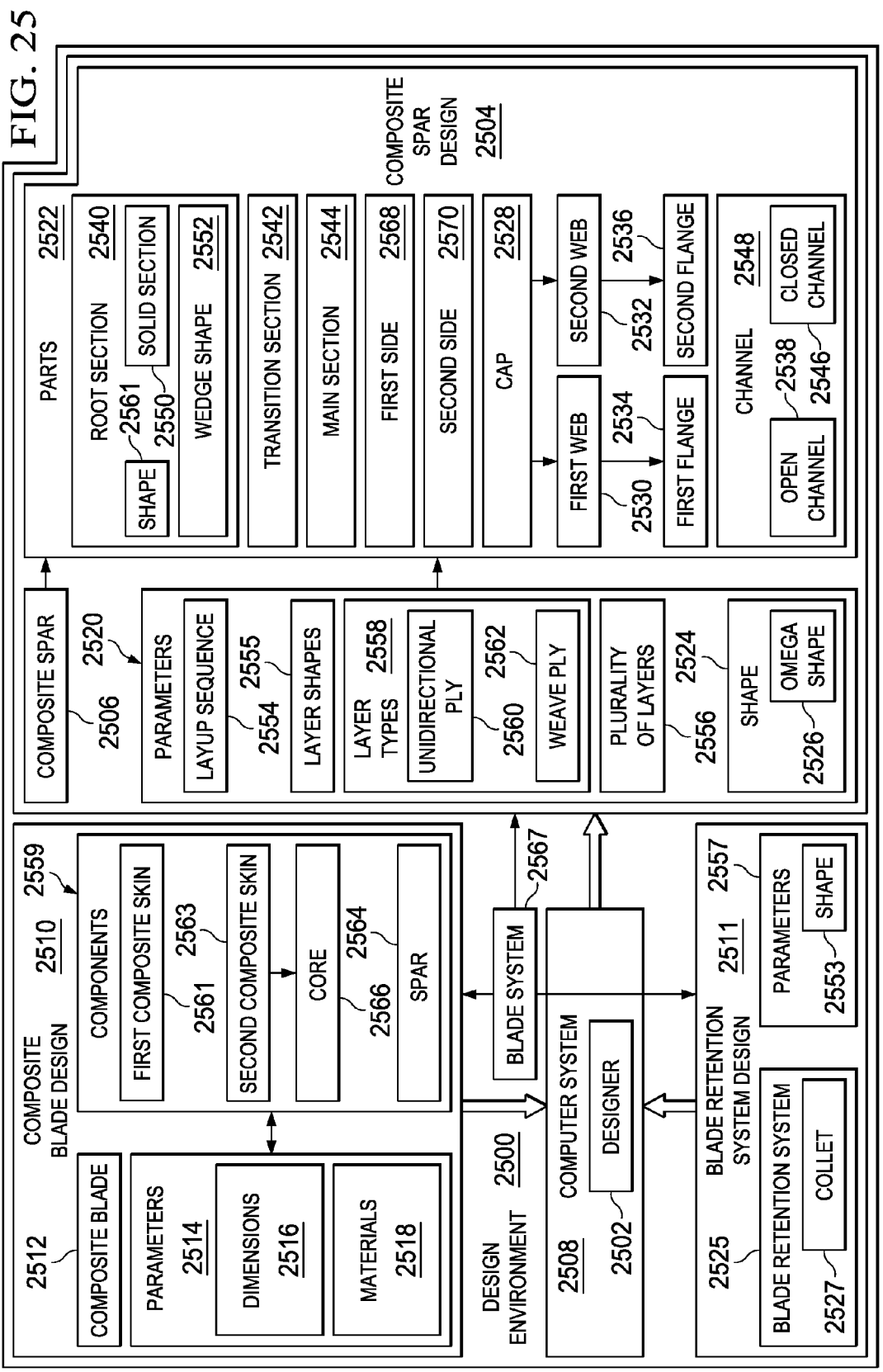
FIG. 25 is an illustration of a design environment in accordance with an embodiment.

With reference now to FIG. 25, an illustration of a design environment is depicted in accordance with an embodiment. In this illustrative example, design environment 2500 includes designer 2502. Designer 2502 may be implemented to generate composite spar design 2504 for composite spar 2506.

Designer 2502 may be implemented using hardware, software, or a combination of the two. In one illustrative example, designer 2502 is implemented in computer system 2508. Computer system 2508 contains one or more computers. When more than one computer is present, computers within computer system 2508 may be in communication with each other. This communication may occur using a communications medium, such as a local area network, wireless communications links, or some other suitable medium.

As depicted, designer 2502 may receive composite blade design 2510, blade retention system design 2511, or both, for composite blade 2512 as input for use in generating composite spar design 2504 for composite spar 2506. In other examples, composite blade design 2510, blade retention system design 2511, or both, may be unnecessary. Further, in some cases, composite blade design 2510, blade retention system design 2511, or both, for composite blade 2512 may be generated as part of generating composite spar design 2504 for composite spar 2506.

When composite blade design 2510 is received, parameters 2514 in composite blade design 2510 are used to generate composite spar design 2504. Parameters 2514 may include, for example, without limitation, dimensions 2516, materials 2518, and/or other suitable parameters for composite blade 2512.

Composite spar design 2504 also includes parameters 2520. Parameters 2520 are present for parts 2522 of composite spar 2506. For example, parameters 2520 include shape 2524 for composite spar 2506. As illustrated, shape 2524 for composite spar 2506 is omega shape 2526.

Parts 2522 for composite spar 2506 include cap 2528, first web 2530, second web 2532, first flange 2534, and second flange 2536. In this example, cap 2528, first web 2530, and second web 2532 define open channel 2538.

These parts may extend through root section 2540, transition section 2542, and main section 2544 in composite spar 2506. In root section 2540, shape 2200 in FIG. 22 may be folded over to create a desired thickness for root section 2540.

Channel 2548 takes the form of open channel 2538 in main section 2544. In other words, channel 2548 is not closed through main section 2544.

Further, channel 2548 also extends through transition section 2542, and channel 2548 may be open channel 2538 and may become smaller in size.

Root section 2540 is closed. As a result, root section 2540 may be solid section 2550 or closed channel 2546, depending on the particular implementation. In these illustrative examples, root section 2540 also has shape 2524. Shape 2524 is configured to be connected to blade retention system 2525 in blade retention system design 2511. In these illustrative examples, shape 2524 may be wedge shape 2552. Blade retention system 2525 in blade retention system design 2511 has shape 2553. Shape 2524 corresponds to shape 2553 in parameters 2557 in a manner that allows composite blade 2512 to be held entirely by root section 2540. In other words, fasteners or other mechanism that may involve forming holes in composite blade 2512 may be avoided when attaching composite blade 2512 to blade retention system 2525 in blade retention system design 2511. In these illustrative examples, the component in blade retention system 2525 in blade retention system design 2511 that has shape 2553 is collet 2527.

Parameters 2520 for composite spar 2506 also may include layup sequence 2554 in layer shapes 2555. Layup sequence 2554 is for plurality of layers 2556 that are laid up to form composite spar 2506 in composite spar design 2504. Layer shapes 2555 are shapes for plurality of layers 2556. For example, layer shapes 2555 may be shapes, such as shape 2200 in FIG. 22, shape 2300 in FIG. 23, shape 2400 in FIG. 24, and other suitable shapes.

Parameters 2520 also may include layer types 2558. Layer types 2558 identify types of composite layers that are used in plurality of layers 2556. For example, layer types 2558 may include unidirectional ply 2560, weave ply 2562, and other types of layers of composite material. Layer shapes 2555 and layer types 2558 may be specified for different layers in plurality of layers 2556 within layup sequence 2554.

For example, a group of first type of layers of composite material using weave ply 2562 may be employed in the initial layers placed down in layup sequence 2554. Thereafter, a group of second type of layers of composite material using unidirectional ply 2560 may be placed down. Thereafter, layers using weave ply 2562 may be placed down. Subsequently, another group of layers using unidirectional ply 2560 may be used.

This sequence may be repeated until the stack up of plurality of layers 2556 is completed. In other words, the operations of laying up a group of first type of layers of composite material for the composite spar and laying up a group of second type of layers of composite material for the composite spar until a plurality of layers of composite material for the composite spar are complete.

In the illustrative examples, the group of second type of layers has a number of lengths selected to provide desired properties for different sections along a length of composite blade 2512. The group of second type of layers may be longer or shorter, or may vary in number, depending on the properties desired for different sections along the length of the blade.

When all of plurality of layers 2556 in layup sequence 2554 have been laid down, the layers for cap 2528 reduce the size of open channel 2538, and root section 2540 becomes closed. In this example, root section 2540 is solid.

At least some of the layers of weave ply in plurality of layers 2556 having shapes, such as shape 2200 in FIG. 22, may be folded over to root section 2540 in wedge shape 2552. In these illustrative examples, a first number of layers of weave ply is unfolded. A second number of layers of weave ply laid up after the first number of layers of weave ply is folder over. Wedge shape 2552 is a blade retention feature in these illustrative examples. At this point, root section 2540 may be solid section 2550 or closed channel 2546, depending on the particular implementation.

In this manner, composite spar 2506 in composite spar design 2504 may be used in composite blade design 2510 of composite blade 2512. In these illustrative examples, components 2559 for composite blade 2512 include first composite skin 2561, second composite skin 2563, spar 2564, and core 2566.

Spar 2564 may be implemented with composite spar 2506 in composite spar design 2504. In these illustrative examples, first side 2568 of composite spar 2506 is bonded to first composite skin 2561, and second side 2570 of composite spar 2506 is bonded to second composite skin 2563. In this illustrative example, first side 2568 is the side on which first flange 2534 and second flange 2536 are located. In these illustrative examples, first flange 2534 and second flange 2536 may be bonded to a first interior surface of first composite skin 2561. Second side 2570 is the side on which cap 2528 is located. Cap 2528 may be bonded to a second interior surface of second composite skin 2563 in these illustrative examples.

In these illustrative examples, layers in plurality of layers 2556 for cap 2528 in root section 2540 fill a first section of channel 2548 while layers forming first flange 2534 and second flange 2536 rise to the level of cap 2528. As a result, plurality of layers 2556 for cap 2528, first flange 2534, and second flange 2536 at the root end of transition section 2542 are on the same plane as plurality of layers 2556 that enter the root section 2100 as shown in FIG. 21 to form solid section 2550 or closed channel 2546. As depicted, solid section 2550 in root section 2540 is configured to distribute loads on composite blade 2512 throughout root section 2540.

Furthermore, shape 2561 for root section 2540 and shape 2553 for blade retention system 2525 may be performed to reduce undesired loads on root section 2540, other parts composite blade 2512, blade retention system 2525, or some combination thereof. For example, shape 2561 for root section 2540 and shape 2553 for blade retention system 2525 may be selected to compress plurality of layers 2556 in root section 2540 during operation of a platform using composite blade 2512.

In particular, shape 2561 for root section 2540 and shape 2553 for blade retention system 2525 may be selected to avoid or reduce pulling away of plurality of layers 2556 from each other, separation of plurality of layers 2556, or the formation or spreading of other undesirable inconsistencies in root section 2540 during operation of a platform using composite blade 2512.

In these illustrative examples, shape 2561 for root section 2540 is wedge shape 2552 and shape 2553 for blade retention system 2525 is a shape that corresponds to wedge shape 2552 such that composite blade 2512 can be held in blade retention system 2525 by these shapes. In other words, forming holes in root section 2540 and the use of fasteners or other retention devices using the holes may be avoided.

The particular shapes and dimensions will vary depending on factors, such as parameters for composite blade 2512, parameters 2520 for composite spar 2506, parameters for blade retention system 2525, the platform in which composite blade 2512 is to be used, and other suitable factors.

In this manner composite blade 2512 in composite blade design 2510, blade retention system 2525 in blade retention system design 2511, and composite spar 2506 in composite spar design 2404 form a blade system 2567 when these components are manufactured from the designs. Blade system 2567 may be implemented to form propeller 104 in FIG. 1.

Figure 26:
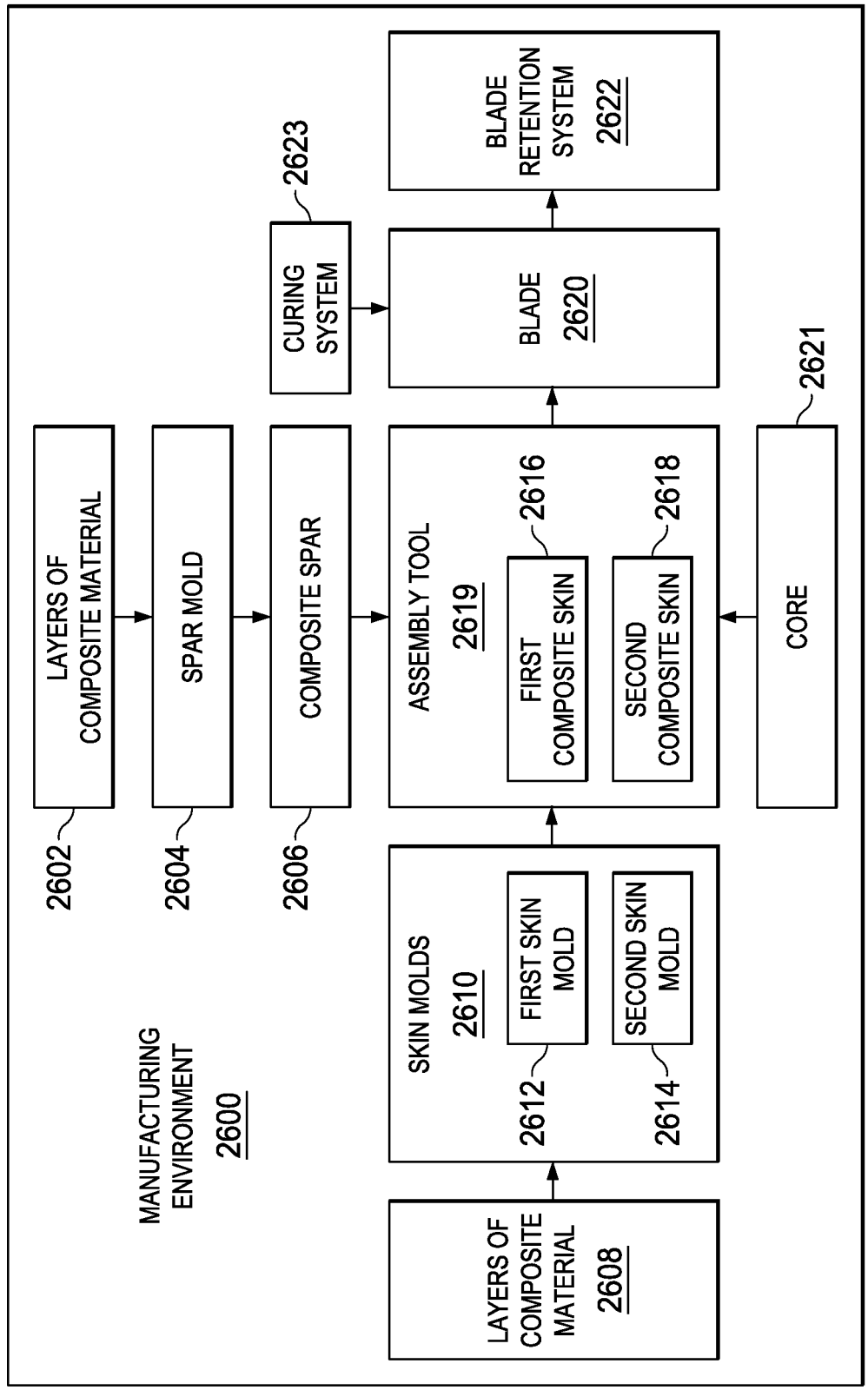
FIG. 26 is an illustration of a manufacturing environment for manufacturing blades in accordance with an embodiment.

Turning now to FIG. 26, an illustration of a manufacturing environment for manufacturing blades is depicted in accordance with an embodiment. In this illustrative example, manufacturing environment 2600 may be used to manufacture composite blades, such as composite blade 106 in FIG. 1.

In this illustrative example, layers of composite material 2602 may be laid up onto spar mold 2604. The configuration of layers of composite material 2602 and the layup of these layers may be performed using composite spar design 2504 in FIG. 25. Spar mold 2604 may be a mold, such as, for example, mold 1500 in FIG. 15.

When layers of composite material 2602 are laid up on spar mold 2604, layers of composite material 2602 may be cured to form composite spar 2606. This curing may be performed using heat, pressure, or some combination thereof. In these illustrative examples, the bag side of the root of the spar is machined to match the geometry of the mold side of the spar using a computer numerical control (CNC) machine. In these examples, the bag side of the root of the spar is the non-mold surface.

Layers of composite material 2608 are laid up on skin molds 2610. The layup of these layers are made using composite blade design 2510 in FIG. 25 in these illustrative examples.

As depicted, skin molds 2610 include first skin mold 2612 and second skin mold 2614. When layers of composite material 2608 are laid up on skin molds 2610, layers of composite material 2608 may be cured to form first composite skin 2616 and second composite skin 2618.

After the different components have been cured, the components are assembled on assembly tool 2619. In this illustrative example, first composite skin 2616 may be placed on assembly tool 2619. Thereafter, composite spar 2606 is a position on first composite skin 2616. Composite spar 2606 is bonded to first composite skin 2616. First composite skin 2616 may have additional layers added to "close-out" the open channel of the spar creating a torque box.

Core 2621 may be placed and bonded with film adhesive such that core 2621 fills the cavities in blade 2620. Core 2621 is a foam core in these illustrative examples. Core 2621 may have a desired level of rigidity. Core 2621 may be, for example, a honeycomb material comprised of a meta-aramid.

In these illustrative examples, the material for core 2621 may be bonded to first composite skin 2616 and second composite skin 2618. In other words, the material may be in two pieces prior to being assembled to form core 2621. In these illustrative examples, the material for core 2621 on first composite skin 2616 and second composite skin 2618 may be shaped by machining or other processes to allow first composite skin 2616 and second composite skin 2618 to be bonded to each other to form blade 2620.

Second composite skin 2618 may then be bonded to composite spar 2606 and first composite skin 2616 to form blade 2620. Adhesive may be used to bond second composite skin 2618 to composite spar 2606 and first composite skin 2616. With these components in place, blade 2620 may be cured in curing system 2623. Curing system 2623 may be, for example, without limitation, an oven that generates heat to a desired temperature to cure the adhesive in a manner that bonds the components to each other. Further, curing system 2623 may include a vacuum bag component that may apply pressure to blade 2620 during the curing process. Blade 2620 may be trimmed, painted, and otherwise processed.

Composite spar 2606 in blade 2620 may be connected to blade retention system 2622 for use in a propeller. In these illustrative examples, layers of composite material 2602 may be cut and laid up on spar mold 2604 based on composite spar design 2504 in FIG. 25. Layers of composite material 2608 may be cut and laid up on skin molds 2610 based on composite blade design 2510 in FIG. 25.

The illustration of design environment 2500 in FIG. 25 and manufacturing environment 2600 in FIG. 26 are not meant to imply limitations to the manner in which different environments may be implemented. For example, composite spar design 2504 may be part of composite blade design 2510 as a single design in some illustrative examples. As another illustrative example, in some cases, core 2566 may be unnecessary. As another example, design environment 2500 also may be used to design composite blade 2512, a blade retention system, and other suitable components.

In yet another illustrative example, manufacturing environment 2600 also may include other tools for manufacturing blade 2620 that were not shown in FIG. 26. For example, other components, such as an autoclave, a heat source, or other suitable heat generation units may be used to cure the layers of composite material. Tools for cutting layers of composite material 2602 and layers of composite material 2608 also may be present in manufacturing environment 2600 to cut the layers of composite material to the desired configurations.

In still another illustrative example, a design for a spar that is not a composite spar may be used in place of composite spar design 2504 for composite spar 2506. Further, the blade may not be composite blade 2512. The different illustrative examples may employ other materials for the blade and spar other than composite materials. For example, the spar and other parts of the blade may be comprises of at least one of a metal, a metal alloy, aluminum, titanium, steel, and other suitable materials in place or in addition to the use of composite materials.

With the use of other materials, shape 2561 of root section 2540 still has shape 2553 in blade retention system 2525 that corresponds to shape 2561. The shapes correspond in a manner that allows for root section 2540 to be retained in blade retention system 2525 by shape 2561 of root section 2540 and shape 2553 of blade retention system 2525 during operation of a platform using the blade. In a similar fashion, these shapes may be selected to reduce or avoid undesired loads on the blade, root section 2540, blade retention system 2525, or some combination thereof.

Figure 27:
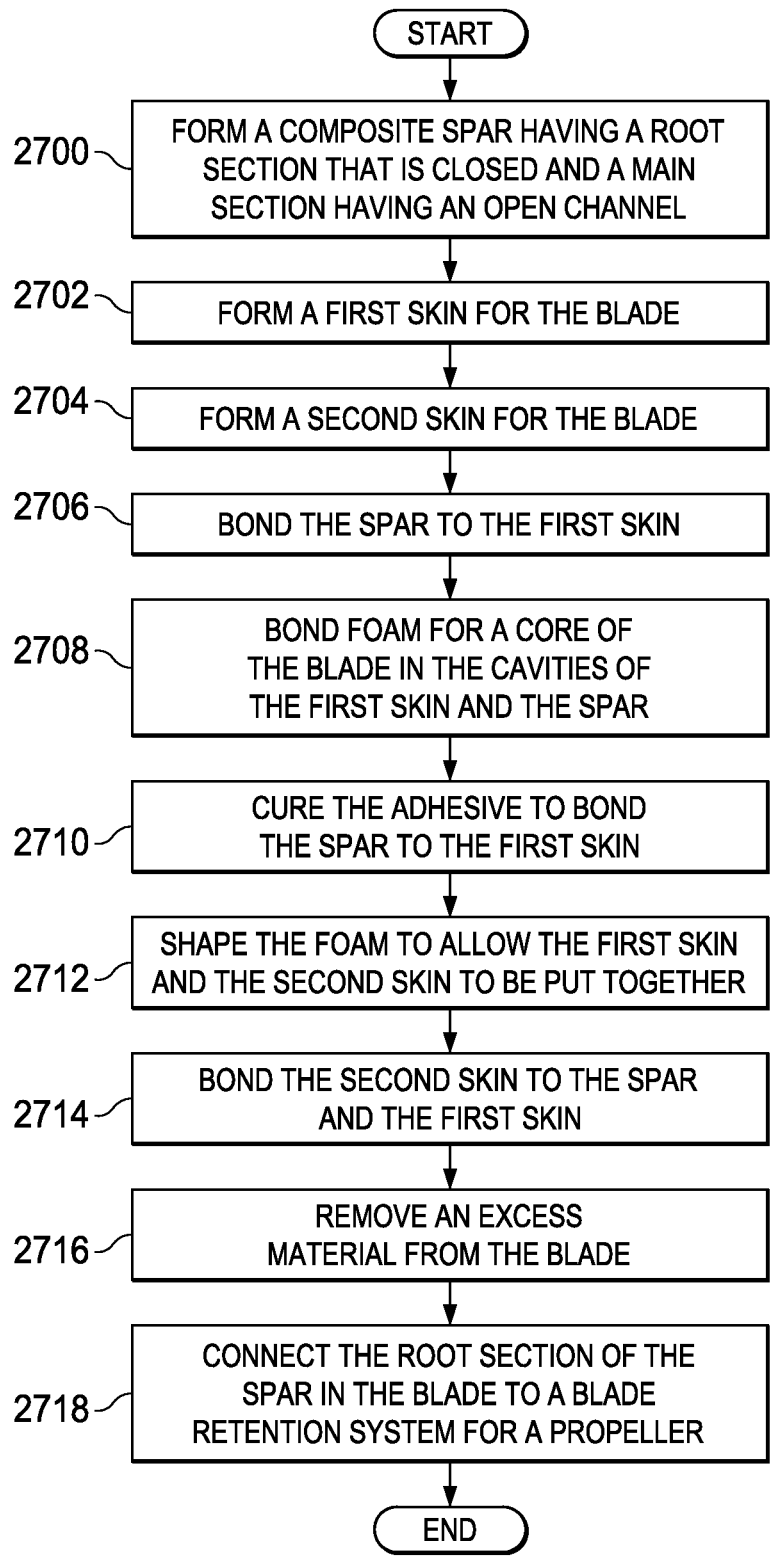
FIG. 27 is an illustration of a flowchart of a process for manufacturing a composite structure in accordance with an embodiment.

With reference now to FIG. 27, an illustration of a flowchart of a process for manufacturing a composite structure is depicted in accordance with an embodiment. In this illustrative example, the process in FIG. 27 is used to manufacture a composite blade. This process may be implemented in manufacturing environment 2600 in FIG. 26.

The process begins by forming a composite spar having a root section that is closed and a main section having an open channel (operation 2700). The root section has a shape configured to be connected to a blade retention system without holes in the root section. The process then forms a first skin for the blade (operation 2702). The process also forms a second skin for the blade (operation 2704).

Next, the process bonds the spar to the first skin (operation 2706). The bonding may be performed using an adhesive. Foam for a core of the blade is bonded in the cavities of the first skin and the spar (operation 2708). The adhesive is cured to bond the spar to the first skin (operation 2710). The foam is shaped to allow the first skin and the second skin to be put together (operation 2712). The second skin is bonded to the spar and the first skin (operation 2714). An excess material is removed from the blade (operation 2716). The root section of the composite spar is located at a root of the blade with the main section extending toward a tip of the blade. The process then connects the root section of the spar in the blade to a blade retention system for a propeller (operation 2718). The process terminates thereafter.

Figure 28:
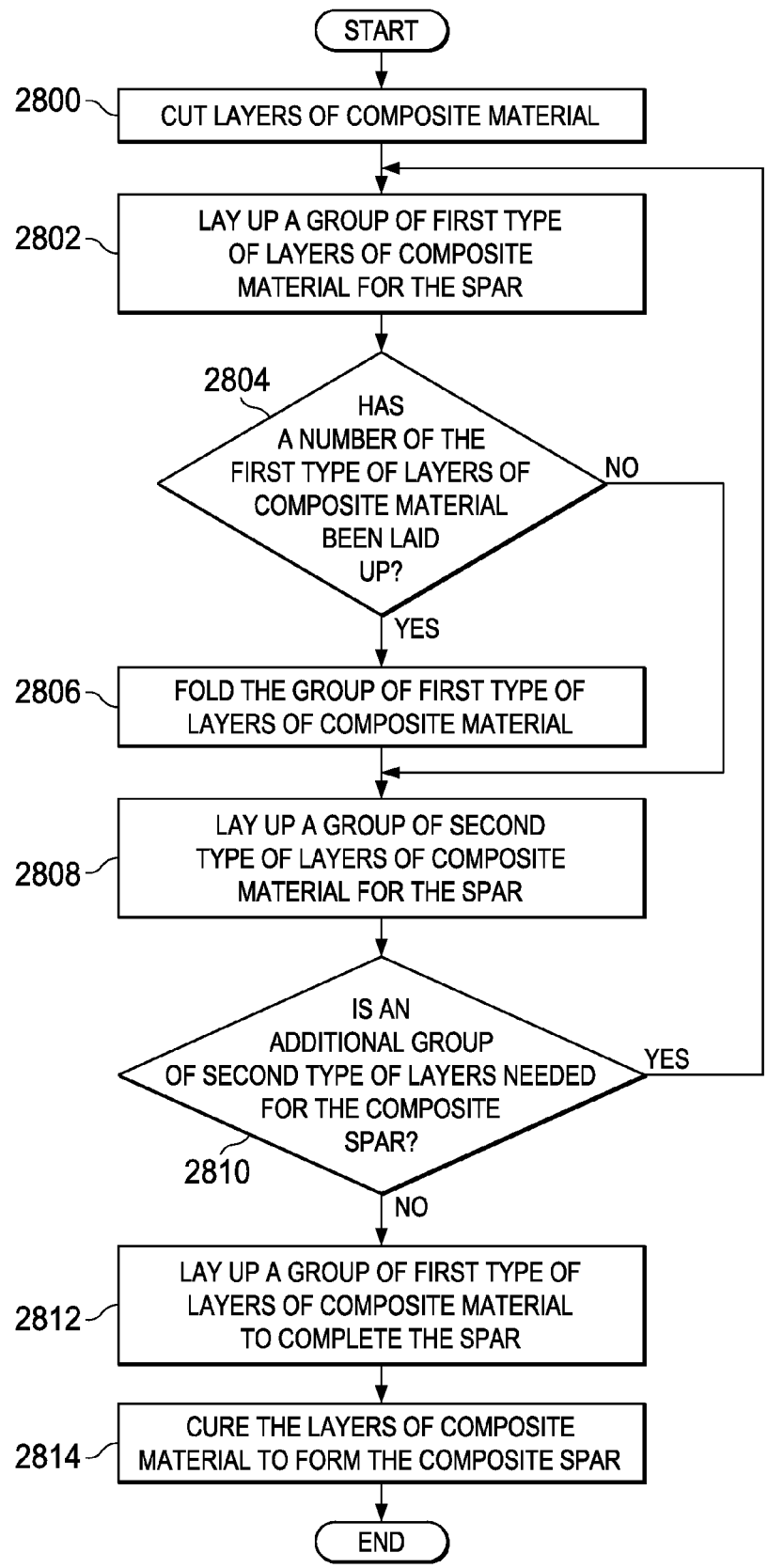
FIG. 28 is an illustration of a flowchart of a process for manufacturing a composite structure in accordance with an embodiment.

Turning next to FIG. 28, an illustration of a flowchart of a process for manufacturing a composite spar is depicted in accordance with an embodiment. The process illustrated in FIG. 28 may be implemented in manufacturing environment 2600 in FIG. 26 using composite spar design 2504 in FIG. 25.

The process begins by cutting layers of composite material (operation 2800). The layers of composite material are plies, in these examples, and are cut on a ply cutting machine. The layers are cut based on composite spar design 2504 in FIG. 25. These layers have a configuration to form a composite spar in accordance with an embodiment.

A group of first type of layers of composite material is laid up for the spar (operation 2802). The layup may be performed using an overhead laser projection machine. A "group", as used herein with reference to items, means one or more items. For example, a "group of first type of layers of composite material" is one or more layers of composite material. In this illustrative example, the group of first type of layers of composite material is weave plies. Each group may have one or more layers of weave plies in this example.

A determination is made as to whether a number of the first type of layers of composite material has been laid up (operation 2804). This number of the first type of layers of composite material is what is left laid open or unfolded in these illustrative examples. The number of first type of layers of composite material laid up from the first group of the first type of layers of composite material may vary, depending on the particular implementation. In one illustrative example, the number of the first type of layers of composite material is half of the total number of layers of composite material that is laid up from laying up the groups of first type of layers of composite material.

If the number of first type of layers of composite material has been laid up, the process folds the group of first type of layers of composite material (operation 2806). The process then lays up a group of second type of layers of composite material for the spar (operation 2808).

In operation 2808, the group of second type of layers of composite material is unidirectional plies. In these illustrative examples, the unidirectional plies in each group may include plies for the cap, a first flange, and a second flange in the composite spar.

A determination is made as to whether an additional group of second type of layers is needed for the composite spar (operation 2810). If an additional group of second type of layers of composite material is needed, the process returns to operation 2802 to continue laying up different groups of layers of composite material.

With this process, later groups of second type of layers of composite material may have shorter lengths for the first flange and the second flange and longer lengths for the cap. In this operation, the group of second type of layers may have shorter lengths than the layers of composite material in the group of first type of layers. The length may be progressively shorter as more layers are added in the group of second type of layers of composite material.

With reference again to operation 2810, if an additional group of second type of layers of composite material is not needed, the process lays up a group of first type of layers of composite material to complete the spar (operation 2812). The group of second type of layers of composite material is configured to fill a second portion of the channel in the root section that would be present without the additional layers from the group of second type of layers of composite material. The process then cures the layers of composite material to form the composite spar (operation 2814), with the process terminating thereafter.

With reference again to operation 2804, if the number of the first type of layers of composite material has not been laid up, the process proceeds to operation 2808. In this instance, additional layers in the group of first type of layers of composite material are to be laid up without being folded.

Figure 29:
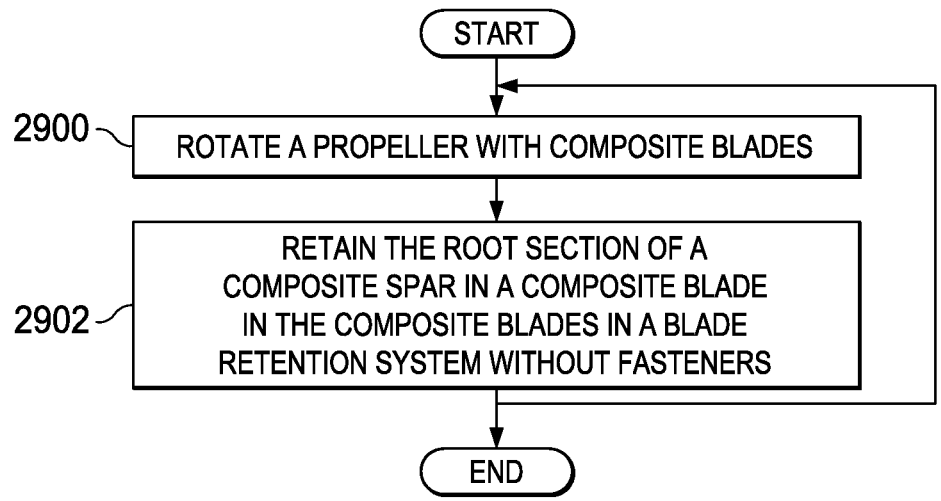
FIG. 29 is an illustration of a flowchart of a method for operating a vehicle in accordance with an embodiment.

Next, in FIG. 29, an illustration of a flowchart of a method for operating a vehicle is depicted in accordance with an embodiment. The process in FIG. 29 may be implemented in a vehicle using composite blades, such as composite blade 106, composite blade 108, and composite blade 110 in FIG. 1. The vehicle may be, for example, aircraft 100 in FIG. 1.

A propeller with composite blades is rotated (operation 2900). The root section of a composite spar in a composite blade in the composite blades is retained in a blade retention system without fasteners (operation 2902), with the process then returning to operation 2900. These operations may be repeated while the vehicle is operating. The composite spar has a root section that is closed and a main section having an open channel, wherein the root section has a shape configured to be connected to the blade retention system.

The flowcharts and block diagrams in the different depicted embodiments illustrate the architecture, functionality, and operation of some possible implementations of apparatuses and methods in an embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 2708 may be omitted in some cases if a core is not desired in the blade. In yet another illustrative example, the different components may be laid up and co-cured with each other rather than being formed separately and bonded to each other.

Turning now to FIG. 30, an illustration of a data processing system is depicted in accordance with an embodiment. Data processing system 3000 may be used to implement one or more computers in computer system 2508 in FIG. 25. In this illustrative example, data processing system 3000 includes communications framework 3002, which provides communications between processor unit 3004, memory 3006, persistent storage 3008, communications unit 3010, input/output (I/O) unit 3012, and display 3014. In this example, communications framework 3002 may take the form of a bus system.

Processor unit 3004 serves to execute instructions for software that may be loaded into memory 3006. Processor unit 3004 may be a number of processors, a multi-processor core, or some other type of processor, depending on the particular implementation.

Memory 3006 and persistent storage 3008 are examples of storage devices 3016. A storage device is any piece of hardware that is capable of storing information, such as, for example, without limitation, data, program code in functional form, and/or other suitable information either on a temporary basis and/or a permanent basis. Storage devices 3016 may also be referred to as computer readable storage devices in these illustrative examples. Memory 3006, in these examples, may be, for example, a random access memory or any other suitable volatile or non-volatile storage device. Persistent storage 3008 may take various forms, depending on the particular implementation.

For example, persistent storage 3008 may contain one or more components or devices. For example, persistent storage 3008 may be a hard drive, a flash memory, a rewritable optical disk, a rewritable magnetic tape, or some combination of the above. The media used by persistent storage 3008 also may be removable. For example, a removable hard drive may be used for persistent storage 3008.

Communications unit 3010, in these illustrative examples, provides for communications with other data processing systems or devices. In these illustrative examples, communications unit 3010 is a network interface card.

Input/output unit 3012 allows for input and output of data with other devices that may be connected to data processing system 3000. For example, input/output unit 3012 may provide a connection for user input through a keyboard, a mouse, and/or some other suitable input device. Further, input/output unit 3012 may send output to a printer. Display 3014 provides a mechanism to display information to a user.

Instructions for the operating system, applications, and/or programs may be located in storage devices 3016, which are in communication with processor unit 3004 through communications framework 3002. The processes of the different embodiments may be performed by processor unit 3004 using computer-implemented instructions, which may be located in a memory, such as memory 3006.

These instructions are referred to as program code, computer usable program code, or computer readable program code that may be read and executed by a processor in processor unit 3004. The program code in the different embodiments may be embodied on different physical or computer readable storage media, such as memory 3006 or persistent storage 3008.

Program code 3018 is located in a functional form on computer readable media 3020 that is selectively removable and may be loaded onto or transferred to data processing system 3000 for execution by processor unit 3004. Program code 3018 and computer readable media 3020 form computer program product 3022 in these illustrative examples. In one example, computer readable media 3020 may be computer readable storage media 3024 or computer readable signal media 3026.

In these illustrative examples, computer readable storage media 3024 is a physical or tangible storage device used to store program code 3018 rather than a medium that propagates or transmits program code 3018.

Alternatively, program code 3018 may be transferred to data processing system 3000 using computer readable signal media 3026. Computer readable signal media 3026 may be, for example, a propagated data signal containing program code 3018. For example, computer readable signal media 3026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 3000 are not meant to provide architectural limitations to the manner in which different embodiments may be implemented. The different advantageous embodiments may be implemented in a data processing system including components in addition to and/or in place of those illustrated for data processing system 3000. Other components shown in FIG. 30 can be varied from the illustrative examples shown. The different embodiments may be implemented using any hardware device or system capable of running program code 3018.

Figure 31:
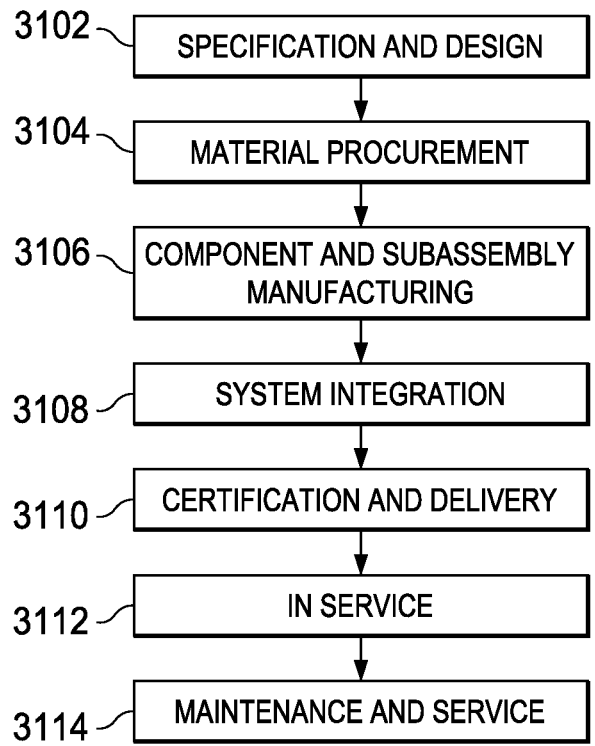
FIG. 31 is an illustration of an aircraft manufacturing and service method in accordance with an embodiment.
Figure 32:
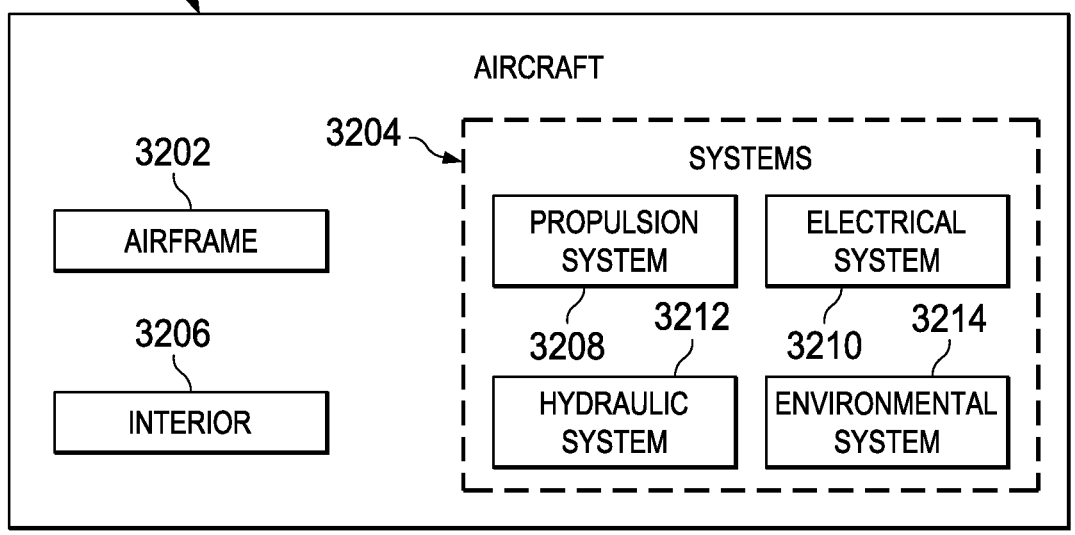
FIG. 32 is an illustration of an aircraft in which an embodiment may be implemented.

Embodiments of the disclosure may be described in the context of aircraft manufacturing and service method 3100 as shown in FIG. 31 and aircraft 3200 as shown in FIG. 32. Turning first to FIG. 31, an illustration of an aircraft manufacturing and service method is depicted in accordance with an embodiment. During pre-production, aircraft manufacturing and service method 3100 may include specification and design 3102 of aircraft 3200 in FIG. 32 and material procurement 3104.

During production, component and subassembly manufacturing 3106 and system integration 3108 of aircraft 3200 takes place. Thereafter, aircraft 3200 may go through certification and delivery 3110 in order to be placed in service 3112. While in service 3112 by a customer, aircraft 3200 is scheduled for routine maintenance and service 3114, which may include modification, reconfiguration, refurbishment, and other maintenance or service.

Each of the processes of aircraft manufacturing and service method 3100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 32, an illustration of an aircraft is depicted in which an embodiment may be implemented. In this example, aircraft 3200 is produced by aircraft manufacturing and service method 3100 in FIG. 31 and may include airframe 3202 with plurality of systems 3204 and interior 3206. Examples of systems 3204 include one or more of propulsion system 3208, electrical system 3210, hydraulic system 3212, and environmental system 3214. Any number of other systems may be included. Although an aerospace example is shown, different embodiments may be applied to other industries, such as the automotive industry.

Apparatuses and methods embodied herein may be employed during at least one of the stages of aircraft manufacturing and service method 3100 in FIG. 31.

In one illustrative example, components or subassemblies produced in component and subassembly manufacturing 3106 in FIG. 31 may be fabricated or manufactured in a manner similar to components or subassemblies produced while aircraft 3200 is in service 3112 in FIG. 31. These components or subassemblies may be, for example, a composite part, a composite blade, a composite propeller, or some combination thereof.

As yet another example, one or more apparatus embodiments, method embodiments, or a combination thereof may be utilized during different stages. For example, composite blades with composite spars may be manufactured during component and subassembly manufacturing 3106 in accordance with an embodiment. One or more apparatus embodiments, method embodiments, or a combination thereof may be utilized while aircraft 3200 is in service 3112 and/or during maintenance and service 3114 in FIG. 31. For example, composite blades with composite spars may be added to aircraft 3200 while in service 3112 and/or during maintenance and service 3114.

Thus, one or more embodiments may provide improved performance in composite blades used in vehicles. These blades may be used as part of assemblies for propellers, rotorcraft blade assemblies, and other suitable systems that use composite blades.

With a composite spar in a composite blade configured in accordance with an embodiment, the closure of the root section of the composite spar may reduce moisture entering the composite blade. In this manner, temperature changes, such as freezing and thawing temperatures, that may be encountered from flight may reduce the formation and expansion of undesired inconsistencies.

Further, with the shape of the root section in the composite spar, the retention of the composite spar in a propeller or other assembly may be made without using fasteners. In other words, with the shape of the spar providing a retention feature for a blade retention system, drilling holes in the composite spar or other portions of the composite blade may be avoided in accordance with an advantageous embodiment. The use of fasteners may also be avoided with the shape of the root section.

The description of the different embodiments has been presented for purposes of illustration and description and is not intended to be exhaustive or limited to the embodiments in the form disclosed. Many modifications and variations will be apparent to those of ordinary skill in the art. For example, although the illustrative example is described with the vehicle being an aircraft, the different embodiments may be applied to other types of vehicles and platforms in which blades are used. For example, the different embodiments may be used with a rotorcraft, a submarine, a surface ship, a windmill, and other suitable platforms.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a root section for a composite spar, such that the root section is configured to be connected to a blade retention system and comprises:
  a central group of composite material layers configured as a central axis of a wedge, the central group of composite material layers encircled by a layer that comprises a first number of weave plies, such that after a first ply in the first number of weave plies wraps around the central group, a first end of each ply of the first number of weave plies overlaps a second end of each ply of the first number of weave plies;
  a second group of composite material layers set around the first number of weave plies;
  additional alternating layers of additional weave plies such that each additional layer of weave plies wraps around an immediately interior second group of composite material layers that set around an immediately interior layer of additional weave plies until a final layer of weave plies forms an outer layer of the root section, such that after a first ply in the final layer of weave plies wraps around the immediately interior group of composite material, a first end of each ply of the final layer of weave plies overlaps a second end of each ply of the final layer of weave plies, and the root section comprises layers that form a wedge shape; and a main section for the composite spar, wherein the main section comprises an open channel that comprises a cap, a first flange, and a second flange, the composite spar being configured such that a compilation of the groups of composite material layers extend from the root section and increase a thickness of the cap, the first flange, and the second flange, and fills the channel at the root section.

2. The apparatus of claim 1, wherein the root section is substantially solid.

3. The apparatus of claim 2 further comprising:
a transition section that changes from being substantially solid in the root section to having the open channel in the main section.

4. The apparatus of claim 1, wherein the shape is configured to be connected to the blade retention system without drilling holes in the root section.

5. The apparatus of claim 1, wherein the composite spar comprises:
the cap;
a first web;
a second web;
the first flange; and
the second flange, wherein the cap, the first web, and the second web, form walls that define the channel in the main section of the composite spar and wherein layers of unidirectional plies and layers of weave plies form the cap, the first web, the second web, the first flange, and the second flange with a solid section at the root section of the composite spar.

6. The apparatus of claim 1, wherein a cross section of the composite spar has an omega shape.

7. The apparatus of claim 5 further comprising:
a first composite skin; and
a second composite skin, wherein the first composite skin and the second composite skin are bonded to the composite spar to form the blade, wherein the first flange and the second flange of the composite spar are bonded to a first interior surface of the first composite skin of the blade and the cap is bonded to a second interior surface of the second composite skin.

8. The apparatus of claim 7 further comprising:
a core filling cavities in an interior of the blade.

9. The apparatus of claim 1, wherein the composite spar is comprised of a plurality of layers of unidirectional plies and a plurality of weave plies laid up in a layup sequence to form the root section, a transition section, and the main section having the shape configured to be connected to the blade retention system.

10. The apparatus of claim 1 further comprising:
a collet having a first piece and a second piece, wherein the collet is configured to retain at least a portion of a solid section with the wedge shape.

11. A method for manufacturing a composite structure, the method comprising:
forming a composite spar comprising a root section and a main section comprising an open channel along a length of the composite spar via:
laying up a first type of layers comprising a first number of weave plies comprising composite material;
laying up a group of second type of layers of composite material on the first number of weave plies;
laying up a second number of weave plies on the second type of layers;
forming the root section of the composite spar via the group of second type of layers of composite material filling the open channel at the root section to form a closed wedge shape for the root section, and maintaining the channel in the main section.via a number of groups of second type of layers of composite material increasing a thickness of a cap, a first flange, and a second flange for the composite spar in the root section and folding over the first number of weave plies after the second number of weave plies are laid up, wherein the first number of weave plies are folded over in a reverse order from an order in which the first number of weave plies was laid up; and repeating the steps of laying up the first number of weave plies comprising composite material for the composite spar and laying up the group of second type of layers of composite material for the composite spar until a plurality of layers of composite material for the composite spar is complete, wherein the root section has a shape configured to be connected to a blade retention system.

12. The method of claim 11 further comprising:
bonding the composite spar to a first skin for a composite blade; and
bonding a second skin for the composite blade to the composite spar and the first skin, wherein the main section extends from the root section towards a tip of the composite blade.

13. The method of claim 11, wherein the root section has the shape configured to be retained by the blade retention system based entirely on the shape of the root section and a corresponding shape of the blade retention system without forming holes for fasteners in the root section.

14. The method of claim 11, wherein the group of second type of layers of composite material is configured to form a solid section in the root section of the composite spar and the solid section of the root section is configured to distribute loads on the composite structure throughout the root section.

15. The method of claim 11, wherein the group of second type of layers of composite material has a number of lengths selected to provide desired properties for a section along a length of the composite structure.

16. A method for operating a vehicle, the method comprising:
rotating a propeller with blades;
forming a composite spar comprising a root section and a main section comprising an open channel along a length of the composite spar via:
laying up a first type of layers comprising a first number of weave plies comprising composite material;
laying up a group of second type of layers of composite material on the first number of weave plies;
laying up a second number of weave plies on the second type of layers;
forming the root section of the composite spar via the group of second type of layers of composite material filling the open channel at the root section to form a closed wedge shape for the root section, and maintaining the channel in the main section.via a number of groups of second type of layers of composite material increasing a thickness of a cap, a first flange, and a second flange for the composite spar in the root section and folding over the first number of weave plies after the second number of weave plies are laid up, wherein the first number of weave plies are folded over in a reverse order from an order in which the first number of weave plies was laid up;

repeating the steps of laying up the first number of weave plies comprising composite material for the composite spar and laying up the group of second type of layers of composite material for the composite spar until a plurality of layers of composite material for the composite spar is complete; and retaining a blade of the blades through the root section of a spar in the blade of the blades being retained to a blade retention system, wherein the root section is shaped and configured to be retained within a corresponding shape for the blade retention system entirely by the shape of the root section and the corresponding shape of the blade retention system.

17. A blade system comprising:
a blade having a root section shaped and configured to be retained within a correspondingly shaped blade retention system entirely by a shape of the root section and a corresponding shape of the blade retention system, such that the root section comprises:
  a central group of composite material layers configured as a central axis of a wedge, the central group of composite material layers encircled by a layer that comprises a first number of weave plies, such that after a first ply in the first number of weave plies wraps around the central group, a first end of each ply of the first number of weave plies overlaps a second end of each ply of the first number of weave plies;
  a second group of composite material layers set around the first number of weave plies;
  additional alternating layers of additional weave plies such that each additional layer of weave plies wraps around an immediately interior second group of composite material layers that set around an immediately interior layer of additional weave plies until a final layer of weave plies forms an outer layer of the root section, such that after a first ply in the final layer of weave plies wraps around the immediately interior group of composite material, a first end of each ply of the final layer of weave plies overlaps a second end of each ply of the final layer of weave plies, and the root section comprises layers that form a wedge shape, such that a compilation of the groups of composite material layers extend from the root section and increase a thickness of a cap, a first flange, and a second flange, of a main section of a spar in the blade, and fills a channel in the main section at the root section.

18. The blade system of claim 17, wherein the root section is part of the spar in the blade.

19. The blade system of claim 18, wherein the spar is comprised of a material selected from one of a composite material, a metal, a metal alloy, aluminum, titanium, and steel.

20. The blade system of claim 17, wherein the shape of the root section is selected to reduce undesired loads on the root section during operation of a platform using the blade retention system.

21. The blade system of claim 17, wherein the shape of the root section is configured to be retained by the corresponding shape in a collet in the blade retention system without fasteners.

* * * * *